INVENTOR.
BORIS SHERSTIUK
BY Bernard E. Franz
ATTY.

Oct. 11, 1966 B. SHERSTIUK 3,278,691

SENDER INCLUDING PULSE GENERATOR FOR DIGITAL COMMUNICATION SWITCHING SIGNALS

Filed May 13, 1963 23 Sheets-Sheet 2

Oct. 11, 1966 B. SHERSTIUK 3,278,691

SENDER INCLUDING PULSE GENERATOR FOR DIGITAL COMMUNICATION SWITCHING SIGNALS

Filed May 13, 1963 23 Sheets-Sheet 8

Oct. 11, 1966 B. SHERSTIUK 3,278,691

SENDER INCLUDING PULSE GENERATOR FOR DIGITAL COMMUNICATION SWITCHING SIGNALS

Filed May 13, 1963 23 Sheets-Sheet 9

Oct. 11, 1966 B. SHERSTIUK 3,278,691

SENDER INCLUDING PULSE GENERATOR FOR DIGITAL COMMUNICATION SWITCHING SIGNALS

Filed May 13, 1963 23 Sheets-Sheet 13

Oct. 11, 1966 B. SHERSTIUK 3,278,691

SENDER INCLUDING PULSE GENERATOR FOR DIGITAL COMMUNICATION SWITCHING SIGNALS

Filed May 13, 1963 23 Sheets-Sheet 18

Oct. 11, 1966 B. SHERSTIUK 3,278,691

SENDER INCLUDING PULSE GENERATOR FOR DIGITAL COMMUNICATION SWITCHING SIGNALS

Filed May 13, 1963 23 Sheets-Sheet 19

Oct. 11, 1966 B. SHERSTIUK 3,278,691

SENDER INCLUDING PULSE GENERATOR FOR DIGITAL COMMUNICATION SWITCHING SIGNALS

Filed May 13, 1963 23 Sheets-Sheet 20

United States Patent Office 3,278,691

Patented Oct. 11, 1966

3,278,691

SENDER INCLUDING PULSE GENERATOR FOR DIGITAL COMMUNICATION SWITCHING SIGNALS

Boris Sherstiuk, Chicago, Ill., assignor to Automatic Electric Laboratories, Inc., Northlake, Ill., a corporation of Delaware Filed May 13, 1963, Ser. No. 280,053
17 Claims. (Cl. 179—18)

This invention relates to a sender for a communication switching system, and more particularly to a sender for use in a register-translator communication switching system having marker controlled switching stages.

A Communication Switching System is disclosed in U.S. patent application Serial No. 230,887, filed October 16, 1962, now Patent No. 3,170,041 by Kore K. Spellnes. Register apparatus for this system is disclosed in patent application Serial No. 231,625, filed October 19, 1962, now Patent No. 3,173,994 by K. E. Prescher, R. E. Schauer and J. G. Van Bosse. The system as disclosed in these applications comprises line group switching stages and markers, group selector stages and markers, a register-sender group, and a translator. There is also an incoming trunk group which provides access from incoming trunks to the registers, and a control center which contains a special computer for operation analysis and recording. The line group switching stage includes a plurality of originating junctors and a plurality of terminating junctors. Originating call requests are identified by the marker which causes a connection to be established from the calling line through tandem switching stages to the originating junctor, and from there to a register junctor and also to a selector inlet. Calling line identity is transmitted from the line group marker, through the register junctor into a receiver for storage by the register. The register apparatus is arranged on a time division multiplex basis with a recirculating memory. Call signals designating the called party directory number are transmitted from the calling line through the originating junctor to the register junctor, and from there are handled on a time division multiplex basis for storage in the register memory. The called party directory number is supplied from the register to the transmitter which returns the called party equipment location number to the register. A sender is then called into operation and supplies a seizure signal which through the register junctor and the originating junctor to the selector inlet calls in the selector marker, which then connects a send-receive circuit to the principal communication conductors of this path from the sender. Part of the called party number is transmitted from the sender to the selector, and used to cause a connection to be established through tandem stages in the selector to an output to either a terminating junctor of a line group for a local call, or to an outgoing trunk circuit for a call to a distant office. If this is a local terminating call the terminating junctor is seized which causes a send-receive circuit in the line group marker to be connected to the principal communication conductors of the path which has been extended up to this point, and the remaining digits of the called number are transmitted thereto. The line group marker then completes the connection from the terminating junctor to the called line. If it is an outgoing call the remaining switching digits are outpulsed by the mode required by the distant office.

The principal object of this invention is to provide sender apparatus which may be used for high speed binary code communication with the local markers, and may be used to transmit any required mode of sending such as dial pulse or multifrequency or any combination thereof for use by the distant offices, with an efficient and reliable arrangement for receiving the called number information from the time division register apparatus and transmitting the information as required.

One feature of the invention relates to an arrangement for two-way communication between the sender apparatus and the switching stage markers, using a high speed binary code transmission. Only two conductors (the tip and ring conductors which in the completed connection will be used for talking or other communication) are used for this high speed binary code pulse transmission. The direction of transmission is alternately switched. The information which may be received from the markers includes a signal indicating that the marker send-receive circuit is connected and ready, signals such as trunk busy, line busy, line idle, resend, and a clear signal after the marker has received all of the needed information and found the required path.

According to another feature, the code pulse send-receive circuits of the selector marker can send alternate route information and ticketing information which is received by the code pulse equipment of the sender and supplied to the register apparatus for storage in the memory.

Other features of the invention relate to the arrangement for outpulsing to a distant office, using either dial pulse or multifrequency mode. A binary counter is used for controlling the outpulsing signals for both of these modes. The counter has four binary bits, and therefore is capable of counting to sixteen, referred to as zero and one to fifteen. The counter may selectively be driven from any one of several sources including a dial pulse generator providing the pulse train required for that mode, a multifrequency pulse generator providing a pulse train required for that mode, and a system clock to provide high speed advance of the counter. One feature provides an arrangement for stopping the clock normally at step 12, and then using the stepping from 12 back to zero with the pulse train of the selected mode to provide an initial seizure time. An arrangement is provided for stopping the counter during this interval in response to a stop dial signal from the distant office. In the multifrequency mode, at the end of the stop dial signal the counter is operated at the fast clock rate up to zero so as to minimize the delay before pulsing starts after the end of the stop dial.

According to one feature of the invention two digits at a time are received from the register memory and are transmitted in the designated mode. The mode may be changed under control of the register each time two additional digits are supplied. When required one of the digit positions may be left blank.

Another feature relates to the resend arrangement. A resend signal may be received from the markers via the binary code pulse transmission, or may be generated in the sender, the signals from the markers being in response to conditions such as link blockage, and the signals from either the markers or locally generated in the sender being in response to various conditions of improper operation such as lack of parity due to noise in transmission. In response to the first such resend signal the terminating path so far established is released and an instruction is sent to the register to start the sending of the called number from the beginning. According to the invention a pair of reed relays are used to control the supply of the call signal to the terminating switching stages and to control the resend operation. One of these relays is a particular reed-type relay which includes a polarizing permanent magnet and differential windings as disclosed in my copending U.S. patent application for a Control Circuit, Serial No. 204,936, filed June 25, 1962, now Patent No. 3,210,615. The other relay uses two windings one of which is shorted to provide slow release operation. The polar relay is operated to one condition upon initial seizure to transmit the call signal to the terminating switching stages, and the slow release relay is also operated under the control of the polar relay. In response to the resend signal the polar relay releases by differential action of the windings and after a predetermined time (50 milliseconds) the slow release relay releases which causes the polar relay to reoperate and thereby again supply the call signal to the terminating switching stages. At this time the slow release relay remains unoperated and supplies a signal condition to electronic gate circuits which causes a second resend signal to be interpreted as a reorder signal. This and other reorder signal conditions cause the terminating switch train to be released and a fast busy tone to be supplied to the calling line.

In one form of the invention each sender transmitter is equipped for universal operation with capabilities for all three modes of transmission, e.g. binary code pulse, dial pulse, and multifrequency.

In the dial pulse transmission mode, the binary counter after it reaches zero transmits one pulse for each step of the counter until coincidence is reached with one of the stored digits, at which time the outgoing pulses are blocked and the counter continues to step from 11 back to 15 and then to zero to provide an interdigital pause, after which the other digit is transmitted in the same manner. In the multifrequency mode the binary counter makes one step for each digit, sending the digit from one position of the storage on odd counts and from the other position on even counts, obtaining additional two digits from the register as required while continuing the count.

The above-mentioned and other objects and features of this invention and the manner of attaining them will become more apparent, and the invention itself will be best understood, by reference to the following description of an embodiment of the invention taken in conjunction with the accompanying drawings comprising FIGS. 1–26 wherein.

Figure 24:
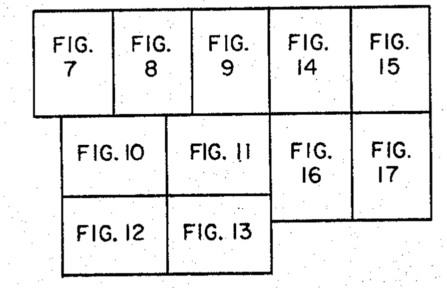
Figure 25:
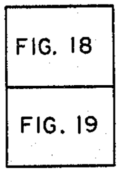
Figure 26:
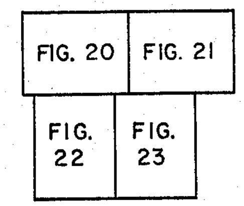
Figure 4:
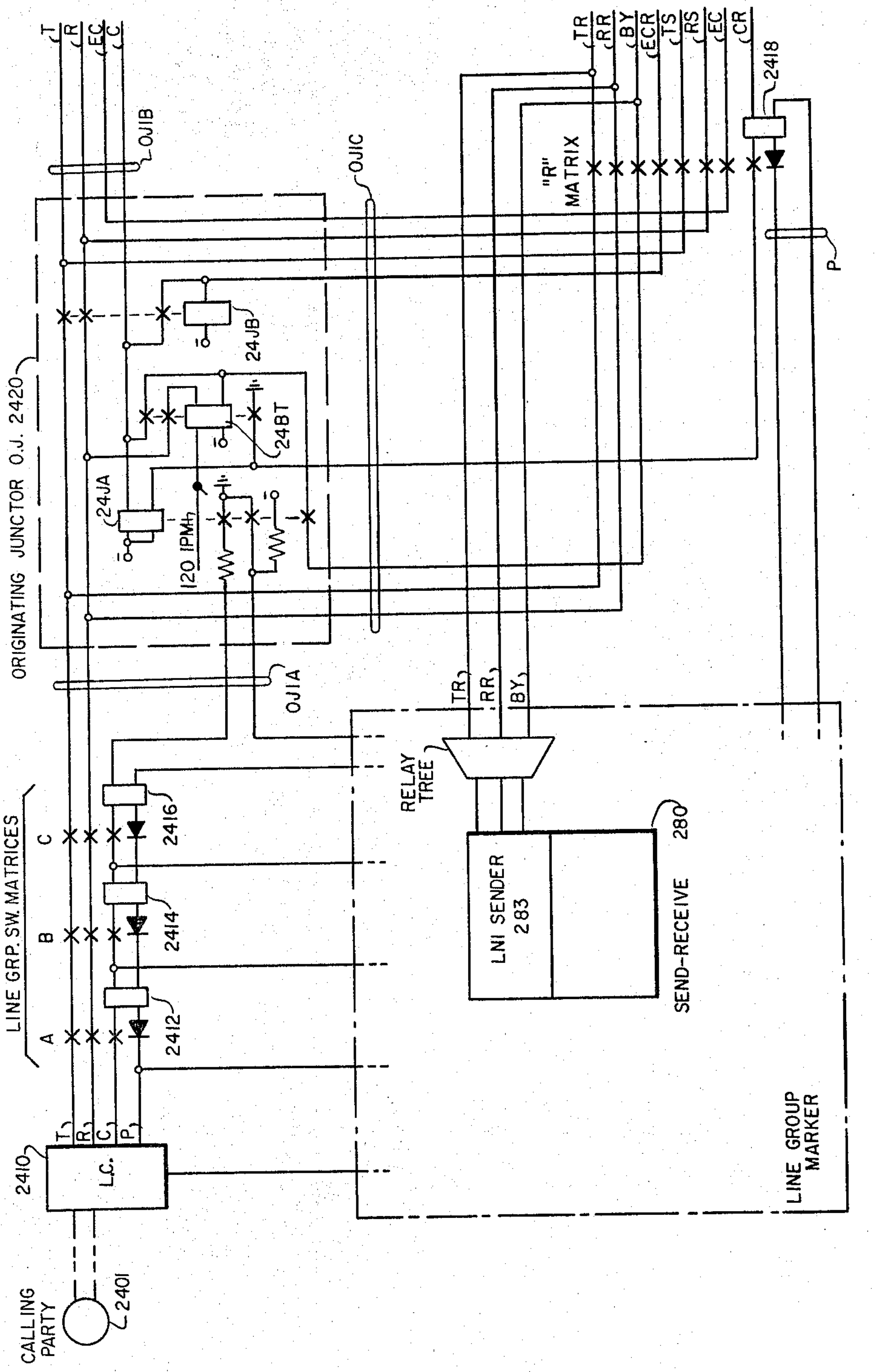
FIGS. 4–6 are to be arranged.
Figure 5:
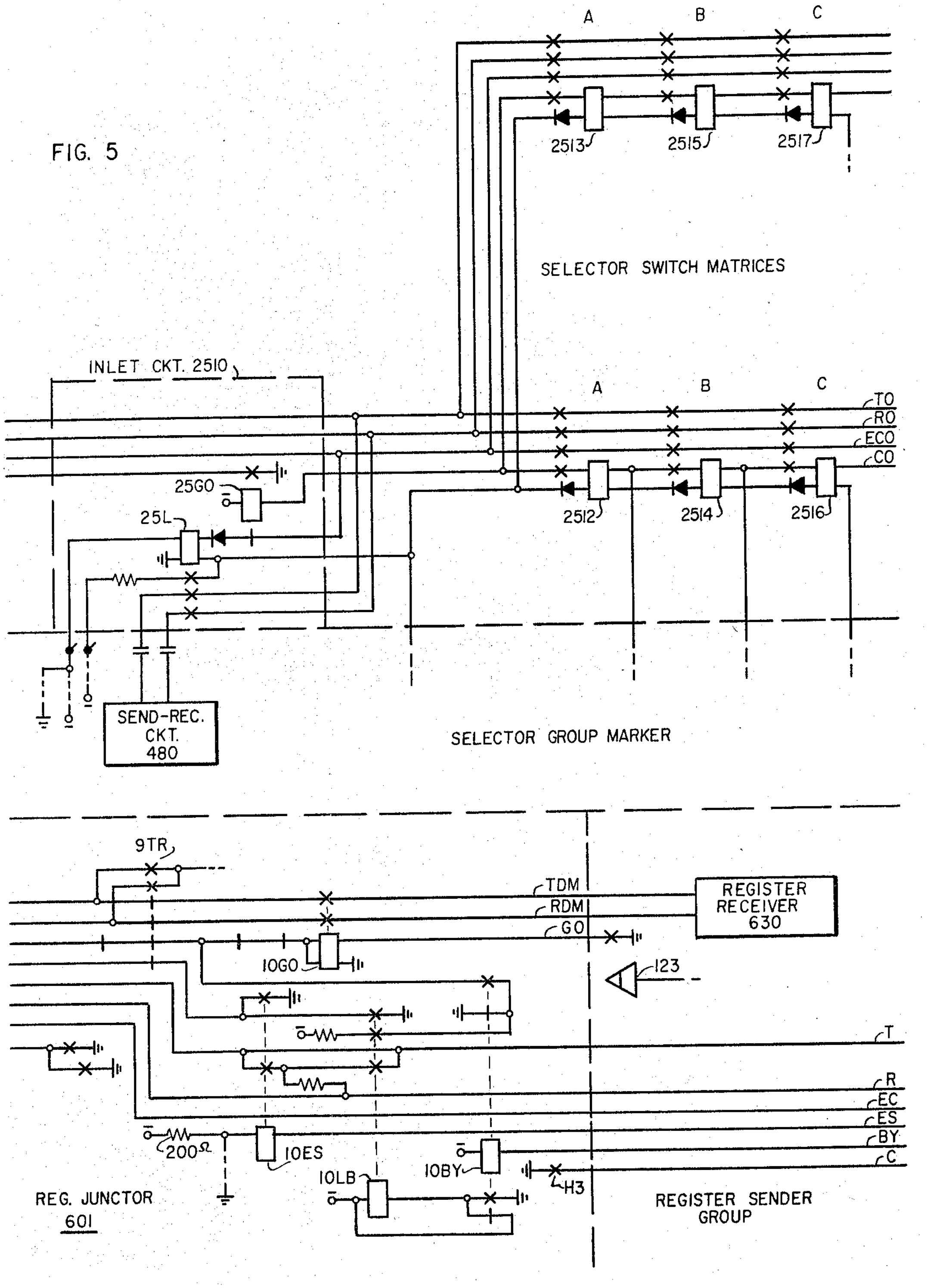
Figure 6:
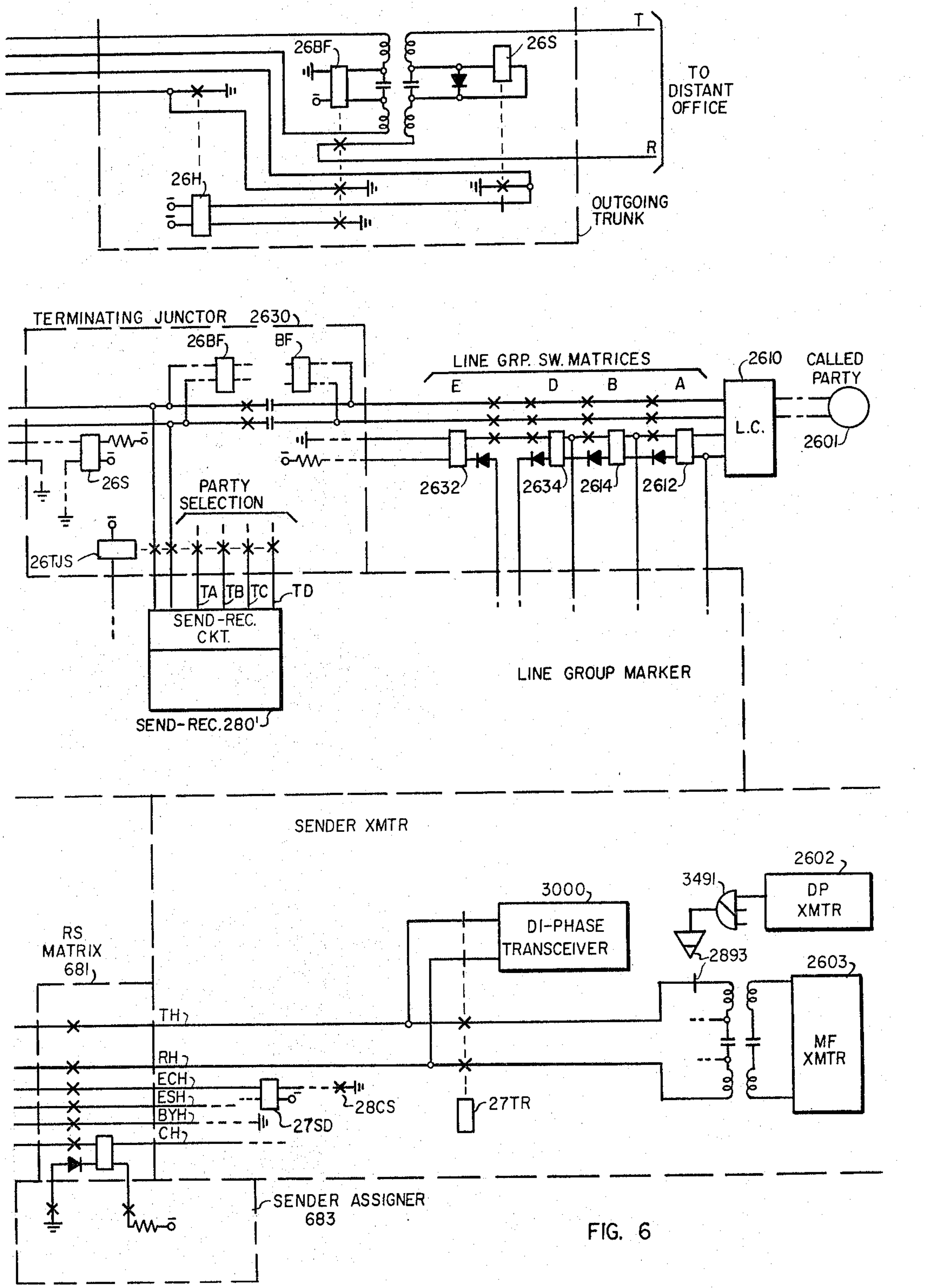
Figure 18:
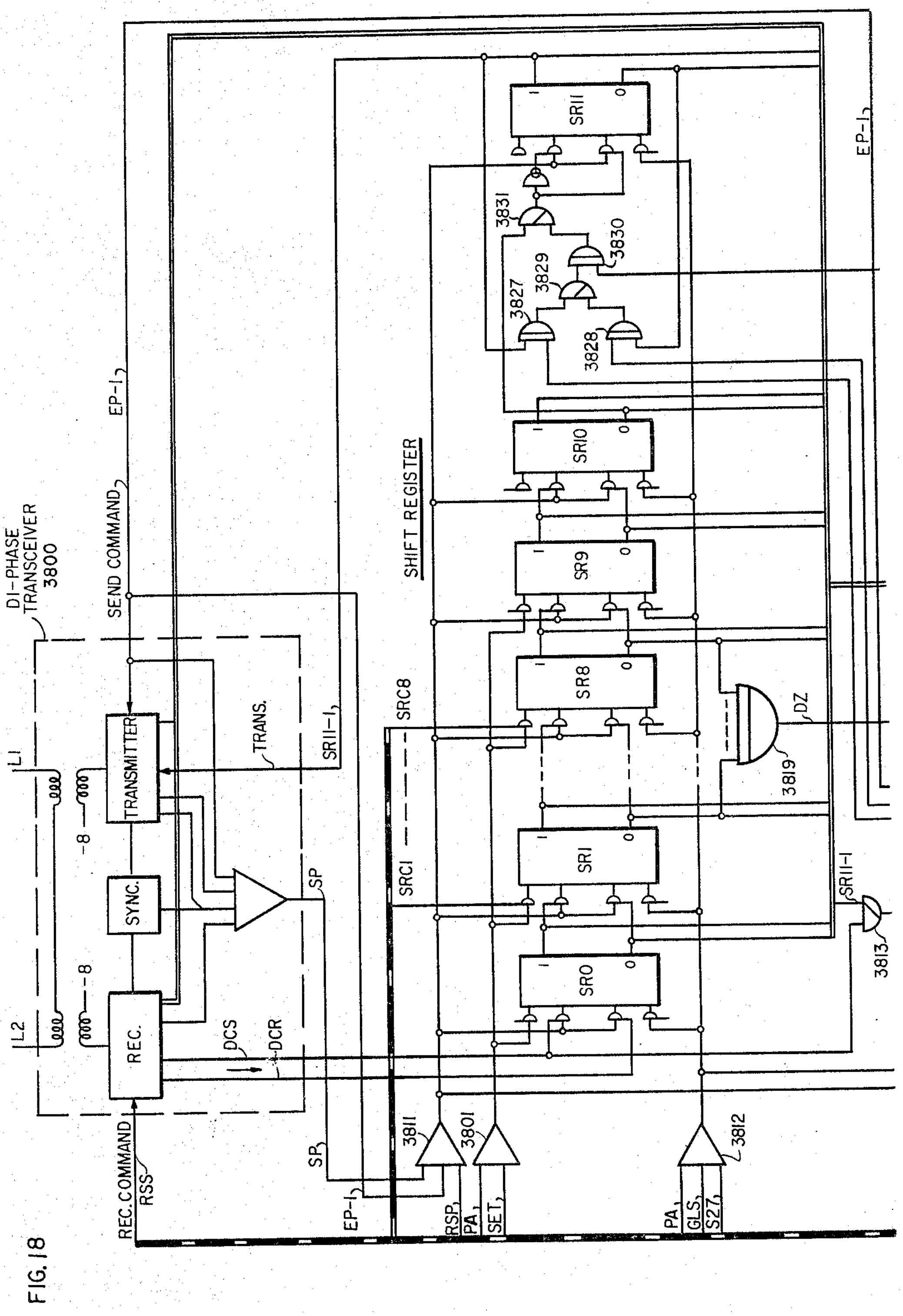
Figure 19:
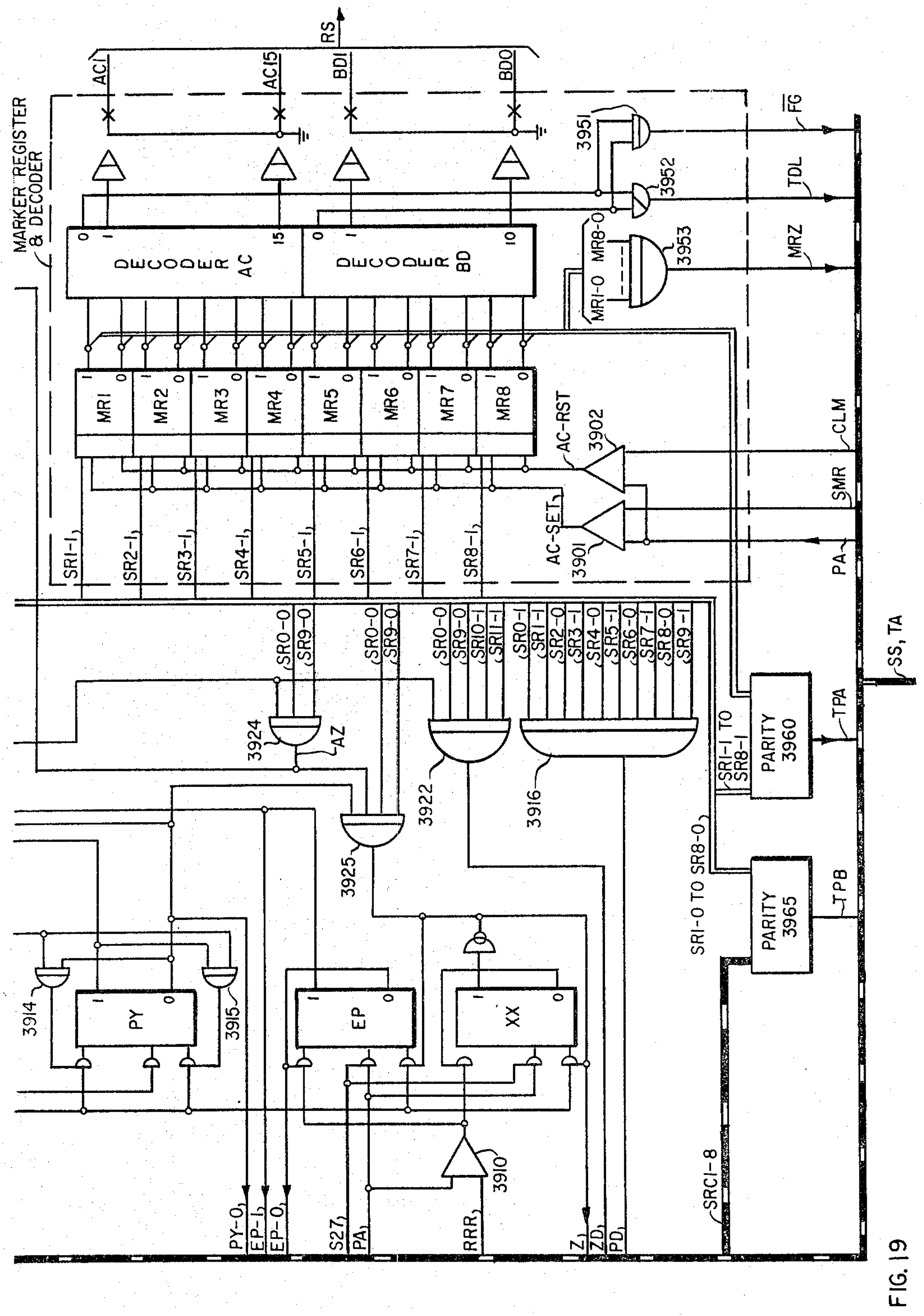
Figure 20:
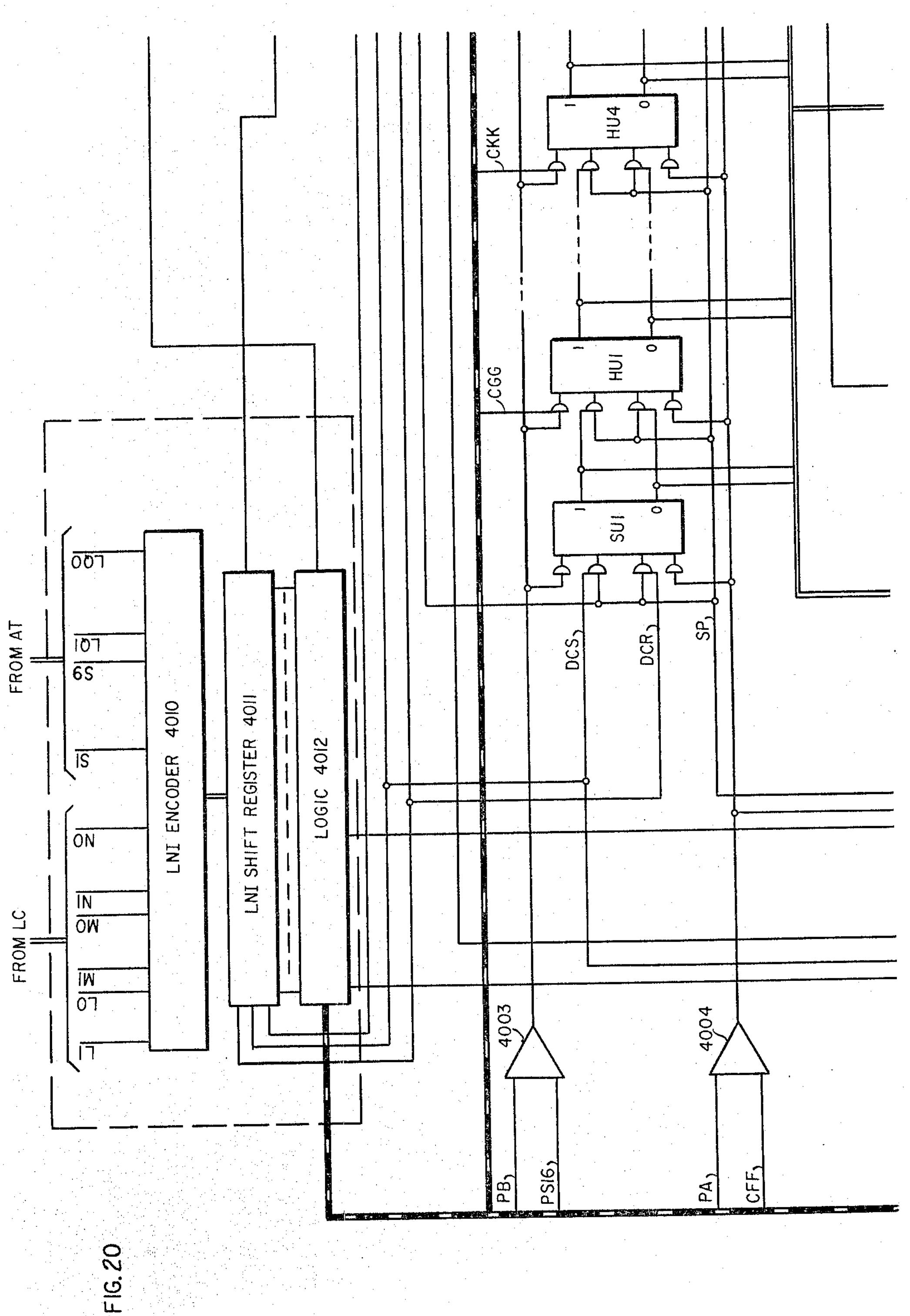
Figure 21:
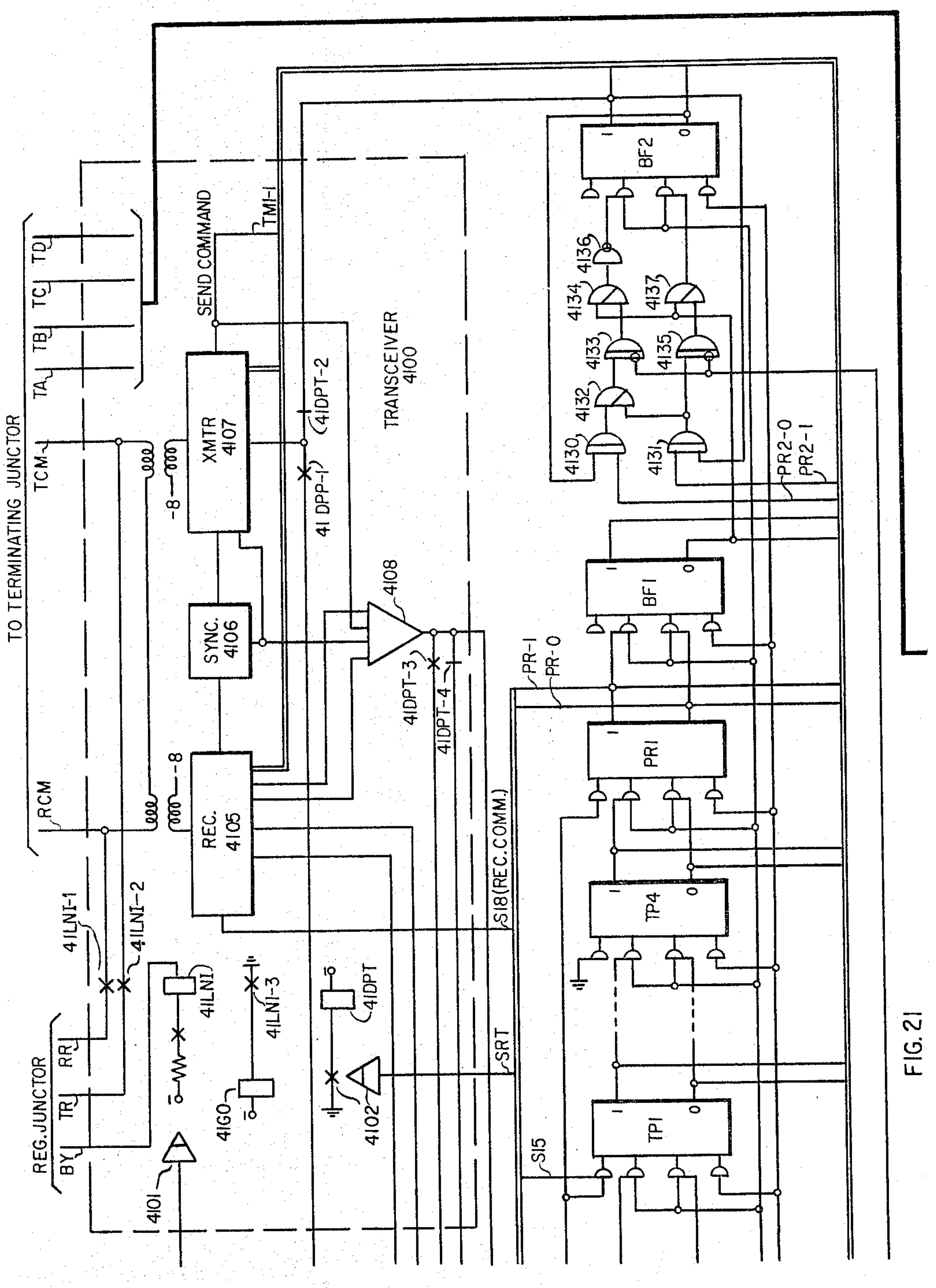
Figure 22:
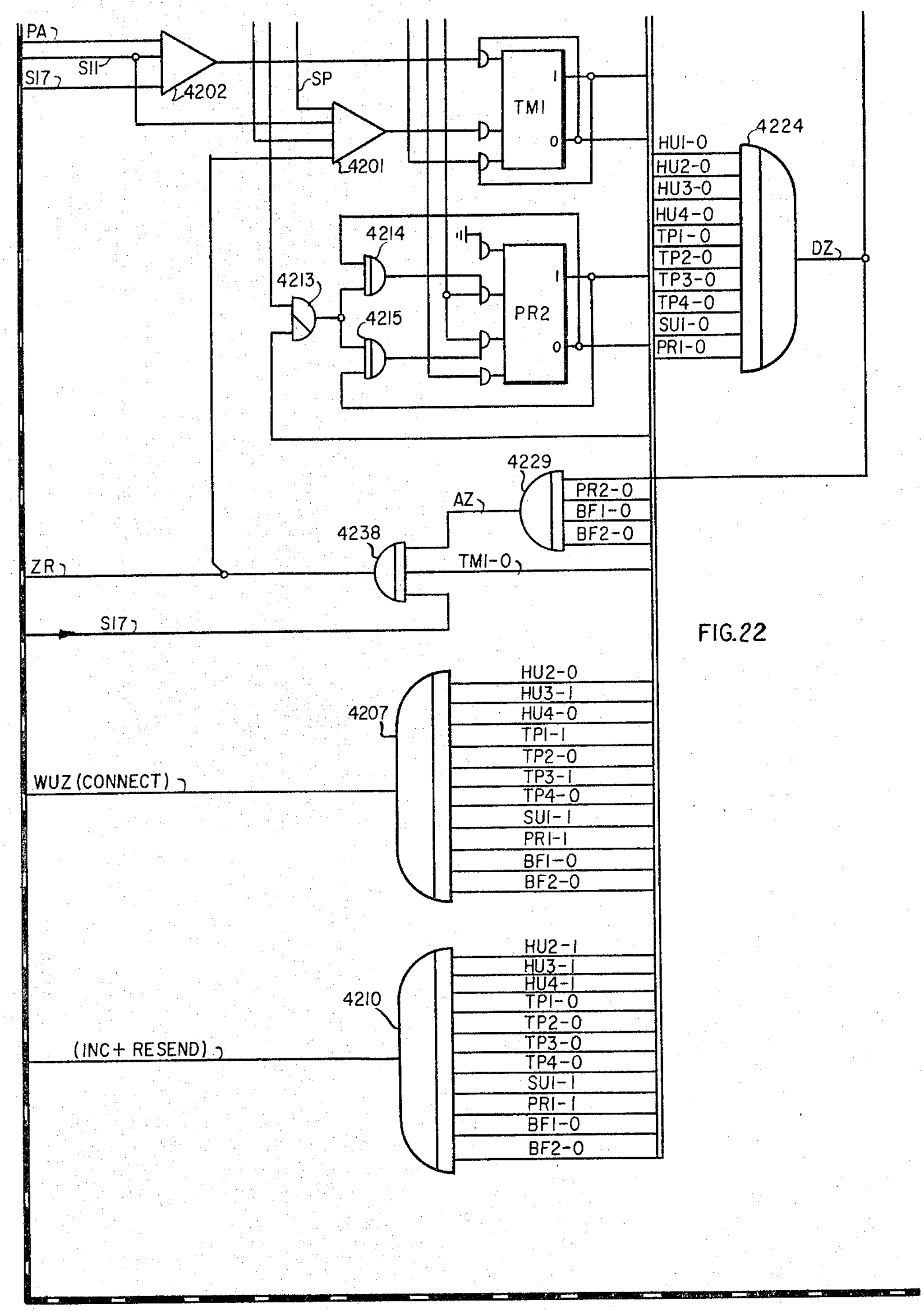
Figure 23:
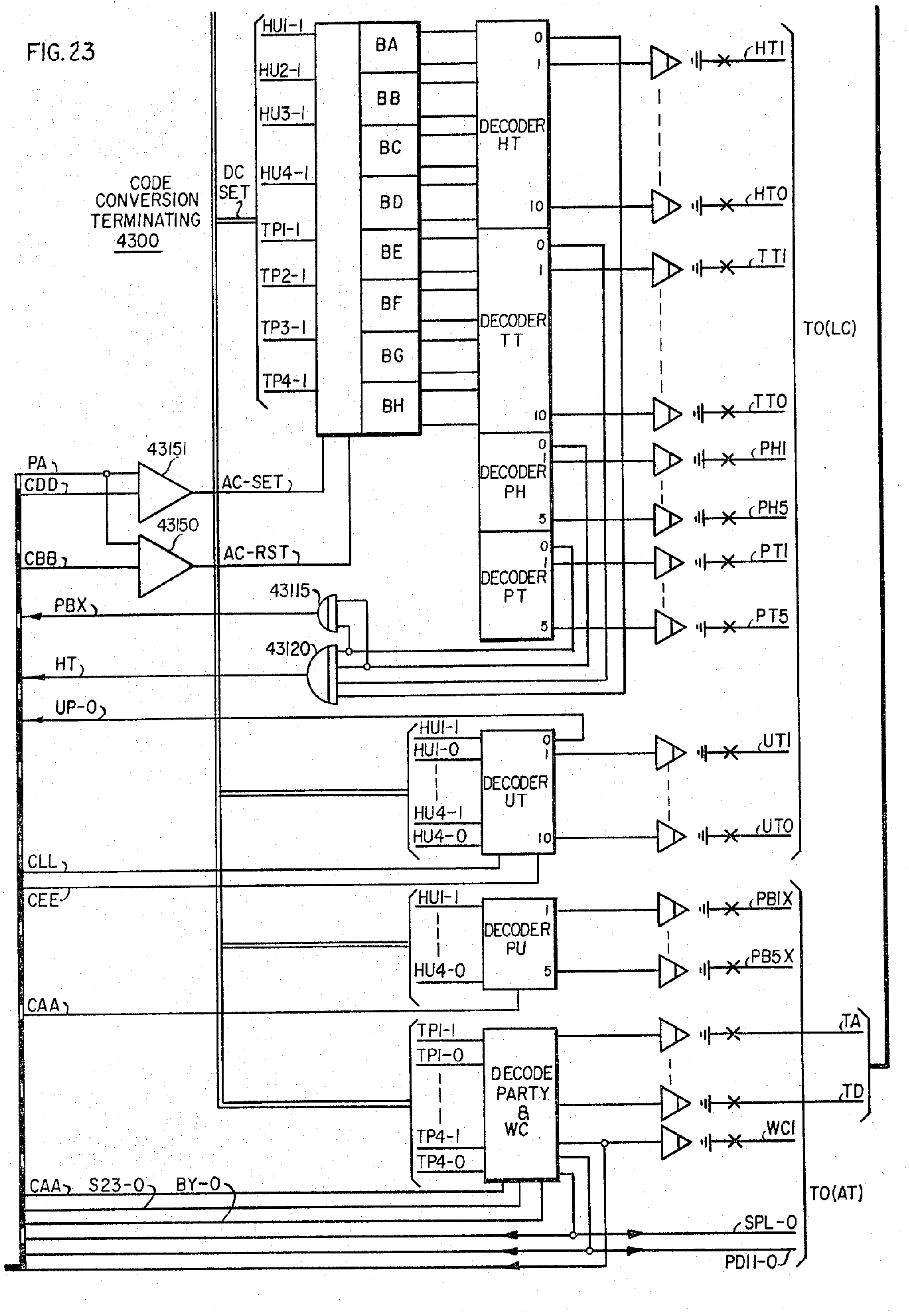

FIGS. 4–6 comprise a call thru diagram;

FIGS. 7–17 comprise a functional block diagram of one sender transmitter;

FIGS. 18–19 comprise a functional block diagram of the send-receive circuit of a group selector marker;

FIGS. 20–23 comprise a functional block diagram of the send-receive circuit of a line group marker;

FIG. 24 shows how FIGS. 7–17 are to be arranged;

FIG. 25 shows how FIGS. 18–19 are to be arranged;

FIG. 26 shows how FIGS. 20–23 are to be arranged.

The system is explained according to the following outline:

PART 1. SYSTEM ORGANIZATION
PART 2. TYPICAL CALL
PART 3. GENERAL DESCRIPTION OF THE REGISTER SENDER
(A) Components
(B) Operation
PART 4. DETAILED DESCRIPTION OF THE REGISTER SENDER
PART 5. SENDER TRANSMITTER AND MARKER SEND-RECEIVE CIRCUITS
(A) Switch-Thru Diagram
(B) Sender Transmitter
(1) Loop and Switchtrain Supervisory Unit
(2) Di-Phase Sender Controller
(3) Multifrequency and Dial Pulse Controller
(C) Selector Marker Send-Receive Circuit
(D) Line Group Marker Send-Receive Circuit
PART 6. DETAILED OPERATION
(A) Local Call
(B) Outgoing Call
(1) Dial Pulse
(2) Multifrequency

PART 1.—SYSTEM ORGANIZATION

The system consists of the line group 100, group selector 300, register-sender group 600, and the translator 700. There is also a trunk group 500 whch provides access from incoming trunks to the registers, and a control center 790 which contains a special computer for operation analysis and recording, and program upgrading equipment.

All of the electronic equipment is furnished in duplicate, for instance, two line group markers 200 may serve up to ten line groups and two group selector markers 400 may serve up to ten group selectors. A minimum of two register-sender groups 600 will be equipped per office and the translator 700, including the magnetic drum 730 and logic circuitry, will always be furnished in pairs per ten thousand directory numbers.

Time division techniques are used in the register-sender group 600 and in the translator 700. The markers are designated on an electronic basis and semiconductor circuitry is employed throughout the system. A ferrite core memory 660 is used for temporary storage whereas the magnetic drum 730 is used for semi-permanent storage.

The space division switching elements of the system consist of reed relay matrix assemblies in configurations of 10 x 6, 10 x 5 and 10 x 4. The cross-points are made up of reed capsules and having normally two windings. They are mounted on a two layer printed card and the entire assembly constitutes a switching matrix. In some cases the cards are wired together to form a single larger matrix. The system contains no conventional telephone relays, but, similar functions are performed by reed relays. A reed relay assembly is essentially a cluster of magnetic reed elements controlled by coil windings and with or without a permanent magnet. For further description of the reed relay assemblies and cross-point matrix assemblies the following pending United States patent applications may be referred to:

E. J. Glenner and K. K. Spellnes, Crosspoint Switching Arrays, Serial No. 127,237, filed July 27, 1961, now Patent No. 3,188,423.

G. S. Lychyk and A. Taliste, Dry Reed relays, Serial No. 127,648, filed July 28, 1961, now Patent No. 3,128,356.

P. K. Gerlach, G. J. David and R. O. Stoehr, Printed Matrix Board Assembly, Serial No. 132,897, filed August 21, 1961, now Patent No. 3,193,731.

The electronic logic circuitry employs eight standard circuits as building blocks. These standard circuits include NOR gates, inverters, flip-flops, clocks, gated pulse amplifiers, parallel test circuit, parity circuit, and reed relay driver. All of these circuits are implemented on double or single-sided printed cards, 6 inches by 5½ inches.

The two switching stages, the line group and group selector may not necessarily be installed in the same building. The line group may be remotely located and will then operate as a satellite office. No register-senders will be needed in the satellite, but a transceiver will provide for sending and receiving of switching information between the markers of the satellite and the register-senders in the main office.

The method of signaling between the system groups is accomplished by a technique called diphase. This method employs a phase shift technique for serial sending and receiving of pulses.

The group selector may, in connection with the register-sender group and the translator, operate as a trunk tandem office and for this purpose the line group is not necessary. By using matrices with six reed capsules per crosspoint, this group selector marker may accommodate 4-wire switching.

The reason for this flexible operation of the system lies in the fact that the register-sender group, in connection with the storage in the translator, has sufficiently built-in features for the above described operation.

PART 2.—TYPICAL CALL

As an introduction to the system operation, a brief description of a typical local call as processed through the system is now presented. The block diagram may be followed for tracing the call.

When a subscriber lifts the handset, the line group marker 200 goes into action first by detecting the originating call mark, identifying the calling line, and selecting an idle register junctor within the register-sender. A path is then temporarily established from the calling telephone to the register junctor via the A, B, C, and R matrices, and the subscriber receives dial tone. The dialed digits are stored temporarily, coded, and processing is continued as these digits are passed to the translator 700, analyzed for type of incoming call, and instructions are selected from the drum memory 730 and returned to the register-sender 600 to guide further handling of the call. Upon receipt of the remaining digits, the translator 700 returns switching instructions corresponding to the called number as stored in the drum memory 730. The instructions are transmitted from the register-sender 600 via one of the senders 671–680 and the originating junctor 120 of the originating line group to the group selector 300. In the group selector 300, the instructions are analyzed by the marker 400, an idle terminating junctor 130 in the terminating line group is located, and a path established to that line group via the A, B, and C matrices of the group selector. The remaining instructions are followed by the line group marker to locate the called line terminals, select and seize a path from the terminating junctor through the E, D, B and A matrices to the called line. The terminating junctor establishes ringing, answer supervision, and talking battery for both parties when the call is answered.

Since the system is a common control operation, the markers of the line group and group selector function only to serve the assigned portion of the call processing then release to serve other calls. The register-sender 600 and the translator 700 are functioning on a time division basis and therefore are processing several calls simultaneously. The temporary signaling and control paths are released for further service while only the talking paths are held through the switching matrices and junctors.

PART 3—GENERAL DESCRIPTION OF THE REGISTER SENDER

The register sender is a time shared, common control unit with the ability to register and process twenty-four simultaneous calls. The preferred embodiment consists of twenty-four registers and ten senders.

The registers operate in a time division mode. There is one register junctor for every register in the group. Real time to time division entry is provided by the register junctor. Each register consists of two main sections, the first being the common control unit. These time divided circuits are shared by all twenty-four registers. These circuits are used by each register in turn and are organized to provide the needed registration and process control for the registers. The second section consists of a temporary storage facility for the register group. Each register has an assigned storage area wherein all register information is placed to allow time division operation by the common control. A folded word oriented ferrite core memory is used for this purpose.

The extension of the proper switching digits, to the line or trunk selection stages of the system and to other connecting exchanges, is accomplished with a group of ten senders. These senders operate under the control of the registers and are used to transmit information in a dial pulse, multifrequency, or code pulse manner.

Communication with the system translators, line group markers, trunk markers, and group selector markers is accomplished by high speed serial transfer of digital information using diphase.

A. *Components*

Figure 1:
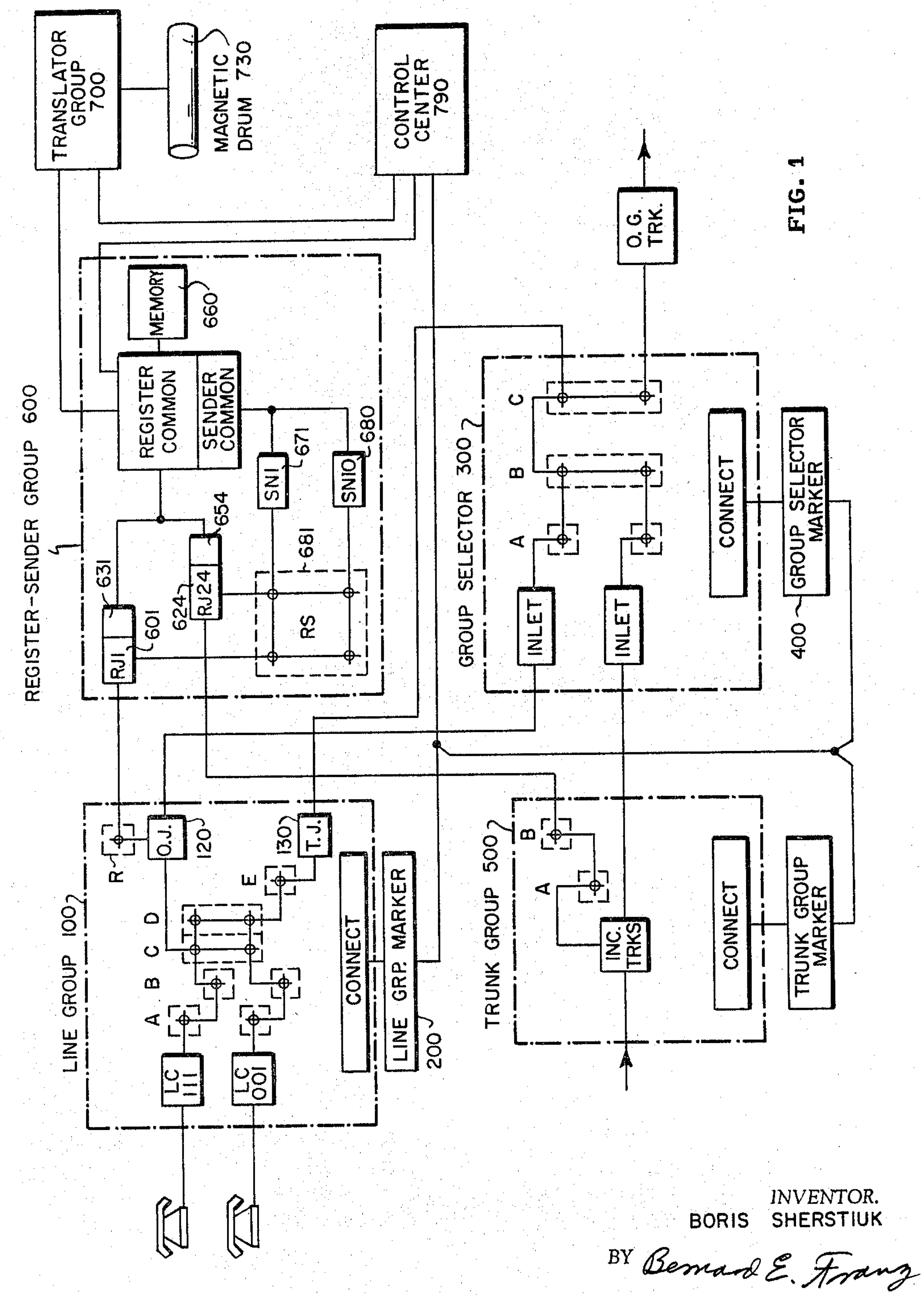
FIG. 1 is a block diagram of a telephone switching exchange.
Figure 2:
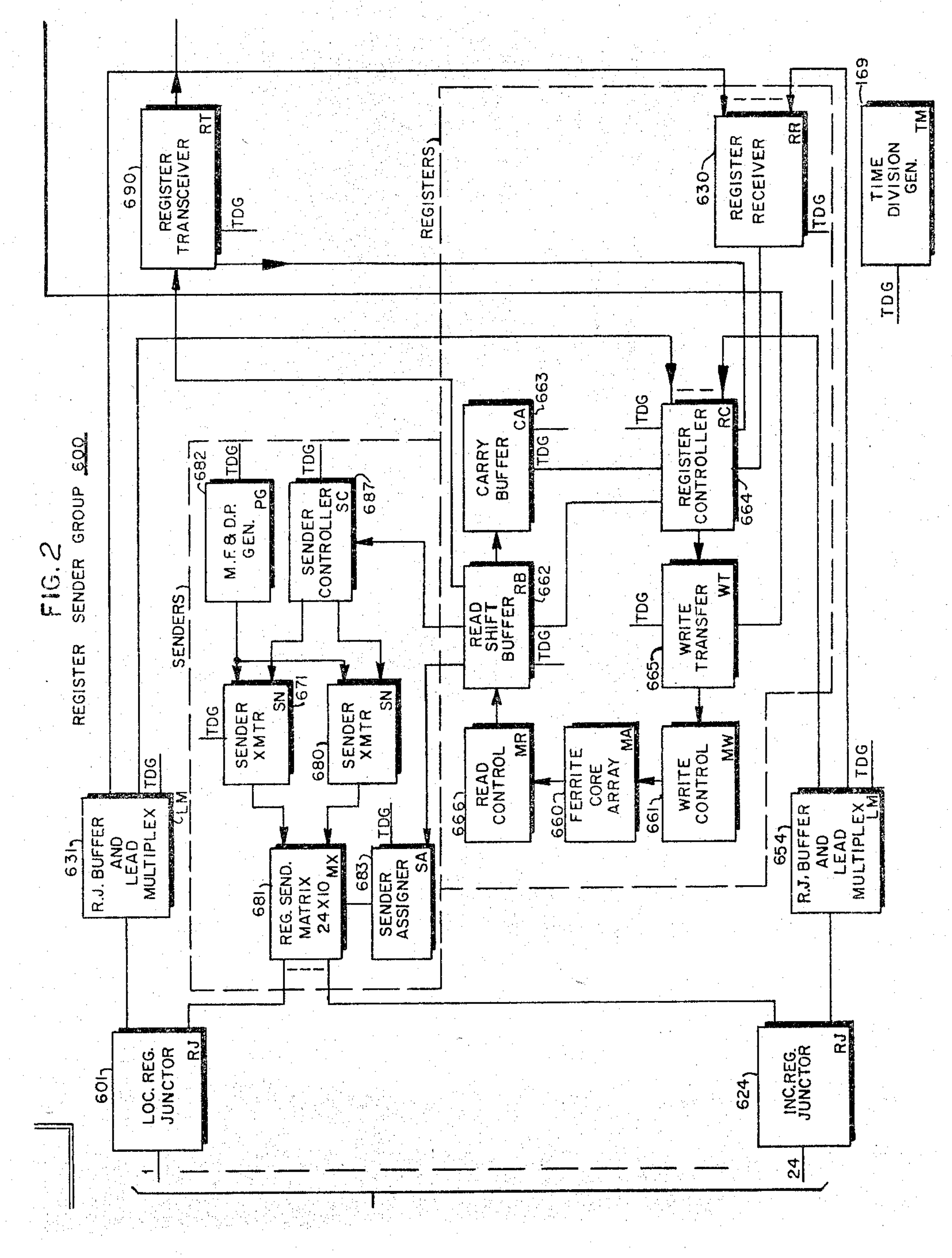
FIG. 2 is a more detailed block diagram of the register-sender group.

In order to facilitate understanding, the following brief description of each of the circuits within the register sender is given, reference being made to FIG. 2.

The primary function of the register junctor, 601–24, is to provide a buffer between the electronic equipment and the outside plant facilities. As such, the circuit employs reed relays for all switching functions, performing all those functions that require direct connection to the calling line or trunk. These include dial pulse repeating, dial tone control, battery feed for the calling line or trunk, calling station identification on party lines, test for coin deposit, coin refund, and test for coin refund. The circuit also controls the switch train and provides for multifrequency and dial pulse.

The sender circuit, 671–80, provides means for transferring information (dialed digits or switching instruction) over the voice transmission path from the register sender to the office markers or to distant offices. The sender is a universal sender inasmuch as it provides all modes of sending required by the system. Diphase sending is employed for transmission of switching instructions to the office markers. The diphase part of the circuit is actually a transceiver since it provides a means of receiving instructions from the markers as well as sending to the markers.

For outgoing calls, the sender provides for both dial pulse and multifrequency signaling. The circuit operates in conjunction with sender controller 687 which is common to all senders in the register sender group. The sender controller supplies the sender with the digits to be sent out and indicates the mode of sending to be employed.

The sender is mainly an electronic circuit except for outgoing loop supervisory equipment where reed relays are used.

The register receiver 630 is seized by the register controller and assigned to serve the register junctor on a hold-til-finished basis. The circuit receives either the line number identification generated by the line markers or the trunk number identification generated by the trunk markers. On seizure of the circuit, a diphase link is established to the marker being served. When all the digits have arrived in the register receiver, the information is presented to the register controller for storage in the area of the ferrite core array associated with the register being served. Upon completion of this storage process, the register receiver is released for use by the next register requiring service.

The time division generator generates the time slot pulses, subtime slot pulses, and control pulses that allow the common equipment to operate in a time division mode.

The time slot pulses create a unique time slot for each of the registers in the group. In association with a group of cores in the core array, they allow a true time division multiplex mode of operation.

The subtime slot pulses allow the use of a folded word memory; wherein each subtime slot accesses a section of the information stored in those cores accessed by a particular time slot. The control pulses allow the controlled generation of decisions while in a particular subtime slot.

The register controller 664, operating on a time division multiplex basis, controls the progress of each call being processed. Within a particular time slot, this circuit updates the information in storage in the section of the core array associated with the time slot register. This updating takes place on a subtime slot basis and is the result of changes in the information presented since the time slot was served last. All information entering the register sender is available to the register controller for proper arrangement and interpretation.

The memoy read 666 and memory write 661 control generates the proper current pulses needed to read and write the cores of the ferrite core array.

The ferrite core array 660 is a sequential access, time slot oriented, temporary storage facility. Each register is assigned a group of cores, which only the time slot with which it is associated can access. This group of cores is accessed in sections by the subtime slots. Each section of the cores stores part of the total available information. The first section contains registration and translation control information. The second contains sender control information. The third and fourth provide for storage of as many as thirteen dialed digits. The fifth contains the line or trunk identity unless a line number translation has been performed. If a line number translation is performed, the calling party's directory number is stored in these cores. The sixth section contains the translated switching digits.

Since each section contains forty cores and each time slot accesses six sections, the total number of cores per register is two hundred and forty. The total ferrite core memory size per register-sender group is 6,600 cores, wherein one complete register storage is reserved for routining and trouble analysis.

The read shift buffer 662 provides a buffer storage for the memory readout. The read shift buffer is also utilized to shift information, in a particular subtime slot, from one core position to another. The read shift buffer, by temporarily holding the contents of a section of the memory word, provides a means for this information to be transferred to other circuits within the register sender group.

The carry buffer 663 provides a place where information read from the memory during different subtime slots can be accumulated until a time is reached, within the time slot, when a decision can be generated on the basis of this information. As a result, by accessing the cores containing the registration and translation control before the time slot is over, an updating process is accomplished based on the decisions made during the time slot.

The register transceiver 690 operates as the communication device for information transfer between the register sender group and the system translators. It, like the register receiver, operates on a hold-until-finished basis. This circuit provides two-way diphase serial communication between the translators and the register sender group. The organization of this circuit is such that the transfer of information from the read shift buffer to the register controller is in a parallel manner. Seizure is dependent on the condition of the control information available in the carry buffer.

The sender controller 687 utilizing information available to it in the read shift buffer, controls the flow of information to be sent by the sender in use. It forwards control signals to the proper senders such as mode of send signals, end of send signals, and release signals. It presents to the senders the appropriate switching, and if necessary, dialed digits for proper routing of the subscriber's call. These digits are obtained from the read shift buffer under the control of the register controller. The sender controller circuit operates in a time division mode and thus serves all registers during each system cycle.

The sender assigner 683, on request of the register controller, will connect an idle sender to the register junctor requiring service. The connection established by the assigner is the beginning of the terminating switch train, which will be extended by the system switching stages on information received from the sender. The sender assigner operates on a hold-til-finished basis.

B. *Operation*

The register sender is a combined local and incoming unit and will handle and process calls of all types of which this call is one of many possibilities.

Upon removal of the handset by the calling subscriber, the line marker identifies the line and searches for an idle register junctor. After finding an idle register junctor, the line marker determines if a patch can be established from the calling line to that register junctor. If so, the line marker extends a call signal through the register junctor and into the register. This signal is recognized by the register controller during the time slot permanently associated with the register junctor requesting service.

This request for service command causes the register receiver to be attached to the register junctor as soon as it is available. Once the register receiver is seized, a "GO" command is extended to the line marker awaiting service. The line marker then forwards the line identity to the register receiver for storage in the register's core storage area.

As soon as the line identity information is successfully stored, the register receiver is released and a hold signal is sent to the register junctor. This signal causes a release of the line marker and the extension of dial tone to the calling subscriber.

The subscriber dialed digits are repeated by the register junctor on to the time division multiplex "pulse highway." As each pulse is recognized by the register controller, it causes the dialed digit storage information, associated with the register, to be updated. As the digits accumulate, they are stored and shifted to their proper location within the register's storage area.

As soon as the first three dialed digits have arrived, a request for the register transceiver is generated and the process digits are coded. The series of digits, called the processing digits, that are contained in the registration and translation control storage area, are given the binary coded decimal values that initiate the translation operation.

This preliminary coding of the process digits will be used by the system translators to select the proper mode of translation. It should be noted that from this point on, in the processing of the call, the register controller will never generate any further coding of the process digits. Each time the system translators return information to the register sender group, the process digits will also be returned. The register controller, on the basis of changes made in the binary coding of the process digits by the translators, will proceed to the next step in the handling of the call. The register controller is organized in a manner that allows it to obey any of the possible instructions and sequence commands inherent in the process digits.

Since a request for the register transceiver has been written, this unit will be seized as soon as it is available. The three dialed digits, the class of service digits, the process digits, will all be loaded in a parallel manner into the register transceiver, from the read shift buffer. The register transceiver requests the service of an idle system translator and as soon as one is attached transmits this information, via a diphase link, to the translator. For the local call being made the translator will upgrade the process digits and return them to the register transceiver. They are then forwarded to the register controller for storage and the register transceiver is released. In this particular instance they will cause the register controller to wait. They will contain the address of the system translator that must be accessed in order to locate the directory number of the particular local subscriber being called. Since both number group and code translations are located on the same drum, the process digits will indicate that a number group translation is to be performed. The register transceiver as soon as it is seized will receive the seven digits of the called directory number, the class of service of the originating line, and the process digits. The system translator, upon receiving this information, will in this instance, locate the proper switching digits and sender instruction digits. This information in addition to an upgraded set of process digits will be returned to the register transceiver. The information in the register transceiver is forwarded to the register controller for storage. As soon as storage is accomplished, the register transceiver is released for use by any other register requiring service.

The register controller, reacting to the new coding of the processing digits will, in this instance, cause a request for the sender assigner. As soon as the sender assigner is seized, it will assign an idle sender to the register junctor requiring service. With the sender attached, the sender instruction digits that have been stored with the switching digits now come into play. The sender sequence state control, accessed by the second subtime slot of the register being served, now forwards the sender control instructions to the sender controller. The sender controller, utilizing the sender control information, forwards the switching digits to the sender. The sender transmits this translated switching information to the proper markers. Two-way communication exists between the system markers and the senders, therefore, the action of the sender will be dependent upon the instructions returned from the markers. The markers are presently arranged to send four different instructions to the sender. These instructions are line idle, line busy, trunk busy, and resend. If line idle is encountered, the signal is repeated to the register junctor which signals the originnating junctor to switch through the signals and releases the sender.

The recognition of a sender release signal, by the register controller, causes the register controller to extend a disconnect signal to the register junctor and returns the register's storage area to the idle condition.

If line busy or trunk busy is encountered by the system markers, the disconnect sequence is the same as for the line idle, but in addition, the busy signal is extended to the originating end.

If the resend signal is returned to the sender, the sender will release the terminating switch train and the register controller will cause the initial send state to be introduced. A second attempt to establish the call will then be made. Only one resend signal will be obeyed. If a second resend signal is received, trunk busy will be returned to the calling subscriber.

PART 4.—DETAILED DESCRIPTION OF THE REGISTER SENDER

A detailed description of the register sender group along with a description of the details of the typical building block circuits appears in Part 4 of Patent No. 3,173,994, and is made a part hereof as though fully set forth.

PART 5.—SENDER TRANSMITTER AND MARKER SEND-RECEIVE CIRCUITS

The senders are universal, in that they provide all modes of sending required by the system. For intraoffice signalling a high-speed code sending technique is used, while for sending to an outlying office the senders provide for either dial pulse or multifrequency signalling, as required by that office. Sending modes may be changed while in the process of routing an individual call.

A "resend" feature is provided to improve the grade of service by allowing a second attempt to complete a call over a different route, if the route first chosen runs into link blockage. It is also used where faulty operation was caused by an intermittent failure (for example, spurious pulses due to noise "spikes" on the intraoffice transmission lines).

When required, the calling as well as the called number can be outpulsed. The calling number may be sent in any of the three outpulsing modes (dial pulse, multifrequency, code pulse).

The sender is divided into the following functional parts: loop and switch train supervisory unit, diphase sending controller, and the multifrequency and dial pulse controller.

The loop and switch train supervisory unit employs reed relays and is intended primarily for isolation of the electronic equipment from the switch trains and outside plant facilities. The specific functions of this circuit are:

(1) Signalling between the sender and the register junctor (seizure, holding, release, reorder, and end-of-send signals).

(2) Trunk supervision.

(3) Sender alarm and traffic metering facilities.

The switching digits sent from the sender to the markers are supplied, two digits at a time, by the common control, on request of the sender. The markers return one of the following instructions, and the sender responds accordingly:

(1) Clear—this instruction causes this circuit to return to the initial "receive" state, to await the "connect" information from the succeeding marker.

(2) Reorder (trunk busy) line busy and line idle—these instructions result in 120 i.p.m. busy, 60 i.p.m. busy, and switch through, respectively. They indicate to the sender that its functions on this call are complete. The instructions are repeated by the sender to the register junctor, which in turn signals the sender to release from the call.

(3) Incomplete—this instruction is sent by the line group marker, and indicates that additional digits are required by the marker to process the call. The circuit clears the transceiver, loads the succeeding two digits, sends the digits to the marker, returns to the receive state, and awaits further instructions from the marker.

(4) Resend—this instruction allows a second attempt to establish the connection, over a different route to the called destination, if the first attempt fails because the links are blocked. The main purpose of this feature is to improve the grade of service.

(5) Trunk identity—this information identifies a point in the switch train where the call may be monitored for answer and disconnect supervision. This number is stored in the register-sender group, and if the call required billing, the number is transferred, along with the calling and called numbers, to the ticketing equipment for call-progress monitoring and time recording.

(6) Alternate route—consists mainly of instructions for the addition or deletion of digits to or from the called number, as determined by the route chosen by the marker. The sender does not analyze these values—it simply recognizes the presence of each digit. After the digits have been recognized and stored by the common equipment, the transceiver goes back to the initial "receive" state.

A. *Switch-thru diagram*

Figure 3:
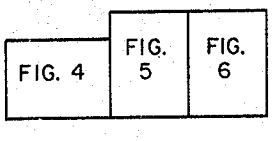
FIG. 3 shows how

FIGS. 4, 5 and 6 when arranged as shown in FIG. 3 comprise a switch-thru diagram which shows a typical connection from a local calling party to either a local called party or to an outgoing trunk. The diagram particularly shows the signalling paths between the switching group markers and the register sender group.

FIG. 4 shows an originating connection through a line group. The calling path extends from a calling party 2401 through his line circuit 2410 and crosspoints 2412, 2414 and 2416 of the line group switching matrices A, B and C respectively to an originating junctor 2420. From the originating junctor the connection extends via line OJ1B to the group selector, and also via line OJ1C and crosspoint 2418 of the R matrix to the register sender group. In the line group marker, only the send-receive circuit 280 is shown, with the connection from the LNI sender 283 via the R matrix to the register sender group. In the originating junctor 2420 relay 24JB provides contacts for splitting the tip and ring conductors between the calling party and the group selector while there is a connection to the register sender group for this call. Relay 24JA provides for holding the preceding switch train and supplying the busy indicating potential. Relay 24BT is provided to supply trunk busy tone to the calling party and to hold the connection until the calling party hangs up.

In FIG. 5 in the upper half there is shown typical paths through the group selector for either a local call or an outgoing call. The inlet circuit 2510 comprises a line relay 25L and a cutoff relay 25CO. The contacts of the line relay provide a connection into the marker, of which only the connection to the send receive circuit 480 is shown. A local call may be extended via crosspoints 2512, 2514 and 2516 of the A, B and C switching matrices; and an outgoing call may be extended via crosspoints 2513, 2515 and 2517 of other A, B and C matrices of the selector.

In FIG. 6 at the top there is shown a typical outgoing trunk circuit, the one shown being arranged for loop pulsing and reverse battery supervision. It includes a battery feed relay 25BF on the local side of the repeat coil, a supervisory relay 26S which is shunted by a diode for polarization on the outgoing side of the repeat coil, and a slow release hold relay 26H.

In the center of FIG. 6 there is shown a typical terminating connection through a line group marker. The connection extends through a terminating junctor 2630, and cross-points 2632, 2634, 2614 and 2612 of switching matrices E, D, B and A; thence through a line circuit 2610 to a called party 2601. In the line group marker only the send receive circuit 280' is shown and particularly the connections thereto used in a terminating call, with connections via contacts of relay TJS in the terminating junctor. Two of these conductors are used for connection to the line loop for receiving the code pulse signals from the sender, and the other four supply party ringing information to the terminating junctor.

The lower parts of FIGS. 5 and 6 show a portion of the register sender group. In FIG. 5 there is shown part of the register junctor 601, and the register receiver 630.

In FIG. 6 there is shown part of one of the sender transmitters. The connection to the sender transmitter extends from the register junctor 601 via a crosspoint of the RS matrix 681. The relay 27TR shows how normally the diphase transceiver 3000 is connected to the line loop, and when this relay is operated the diphase transceiver 3000 is disconnected, and the line loop is extended through contacts of the relay driver 2893 for dial pulse sending and through a repeat coil to an MF transmitter 2603. The dial pulse transmitter 2602 extends through a gate 3491 to drive the relay driver 2893. The showing of the dial pulse transmitter 2602 and multi-frequency transmitter 2603 are merely symbolic here.

Figure 7:
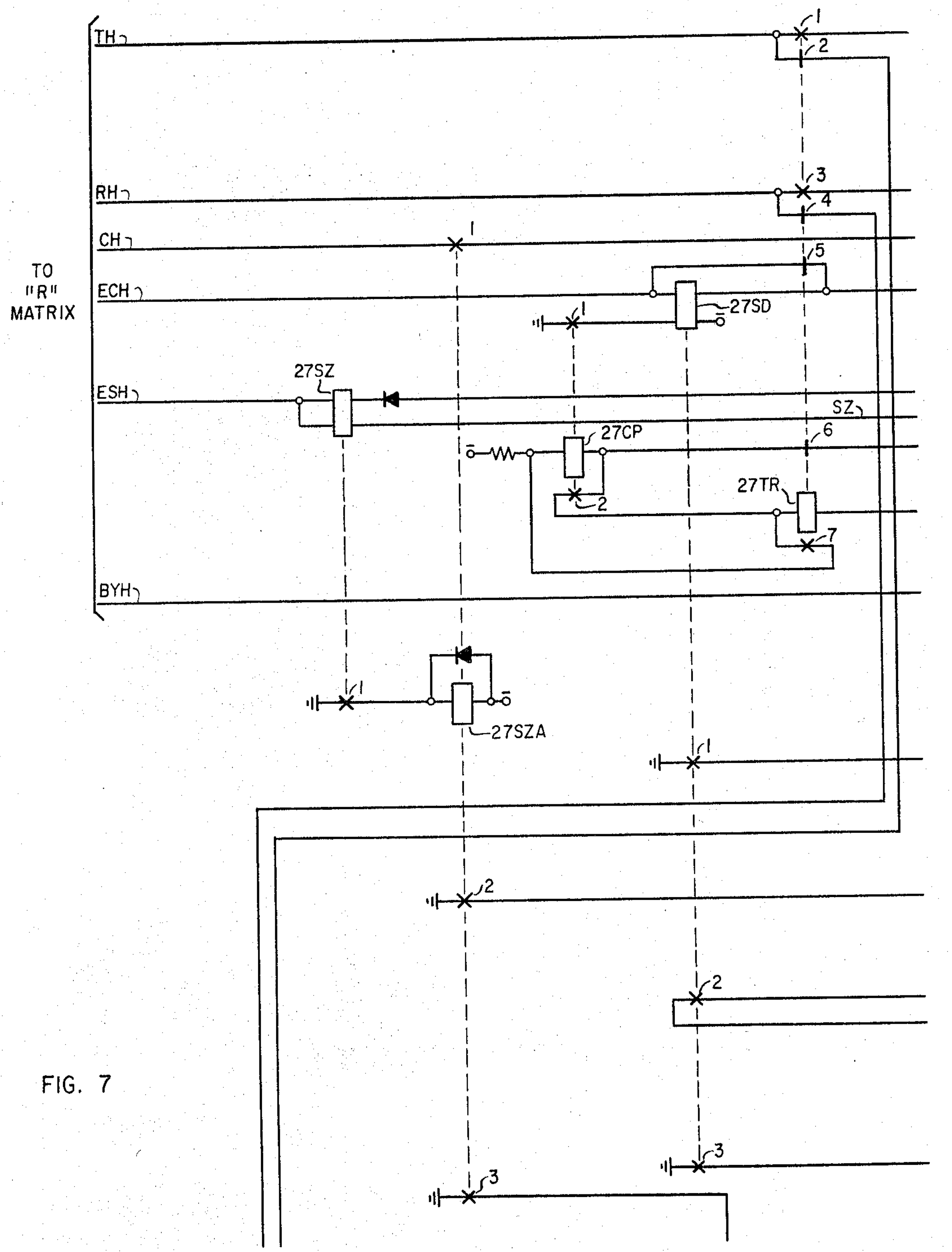
Figure 8:
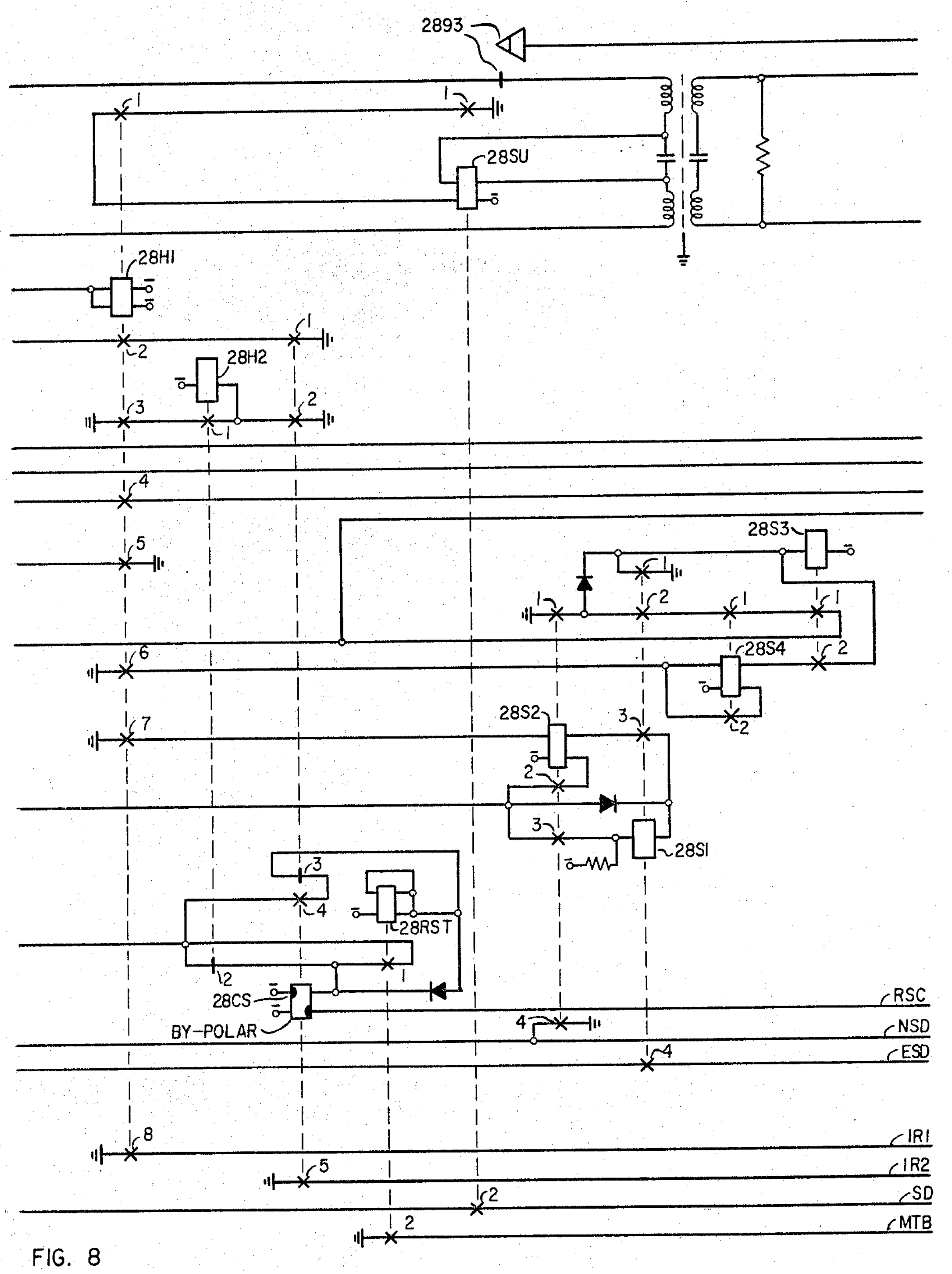
Figure 9:
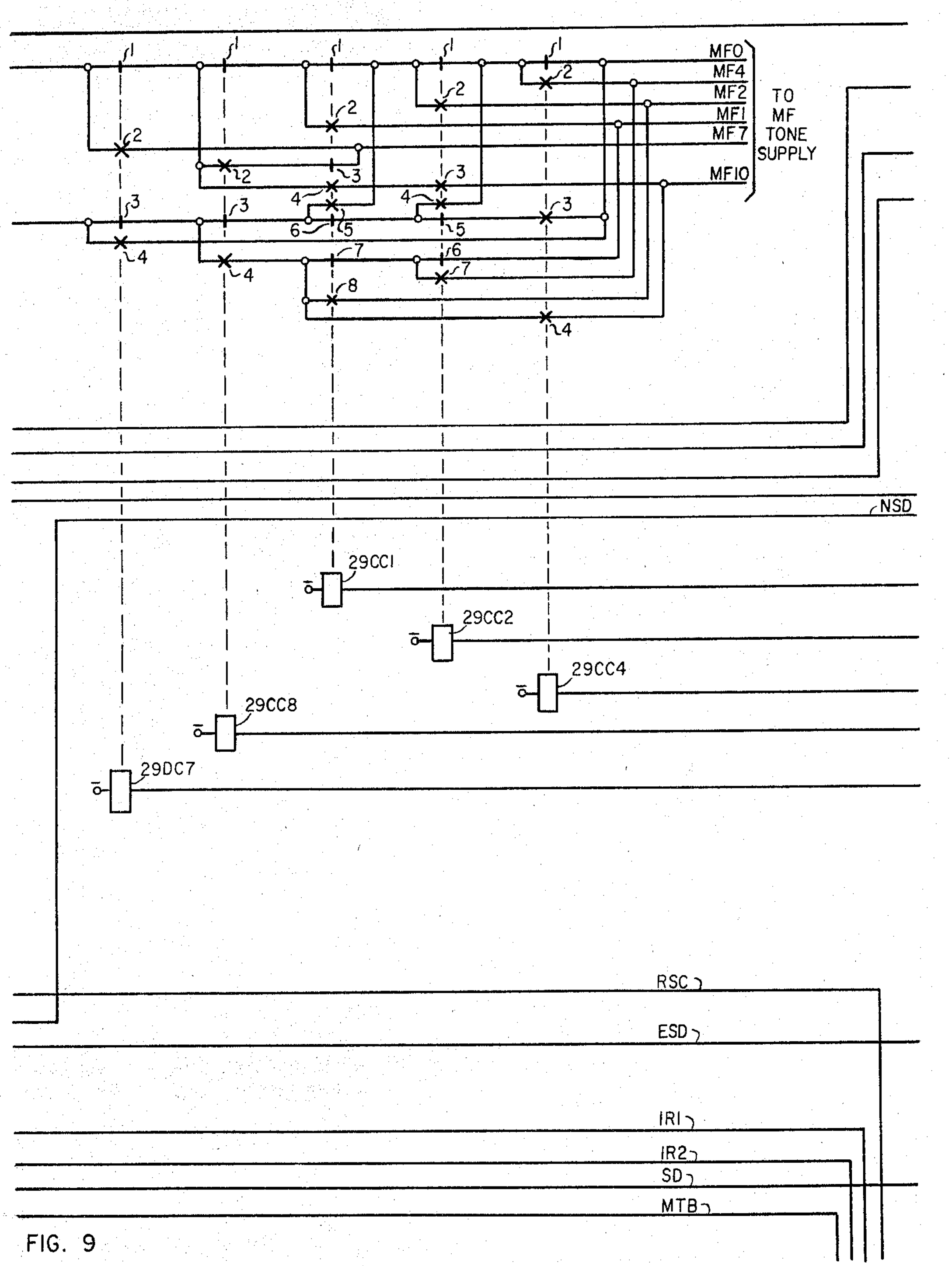
Figure 10:
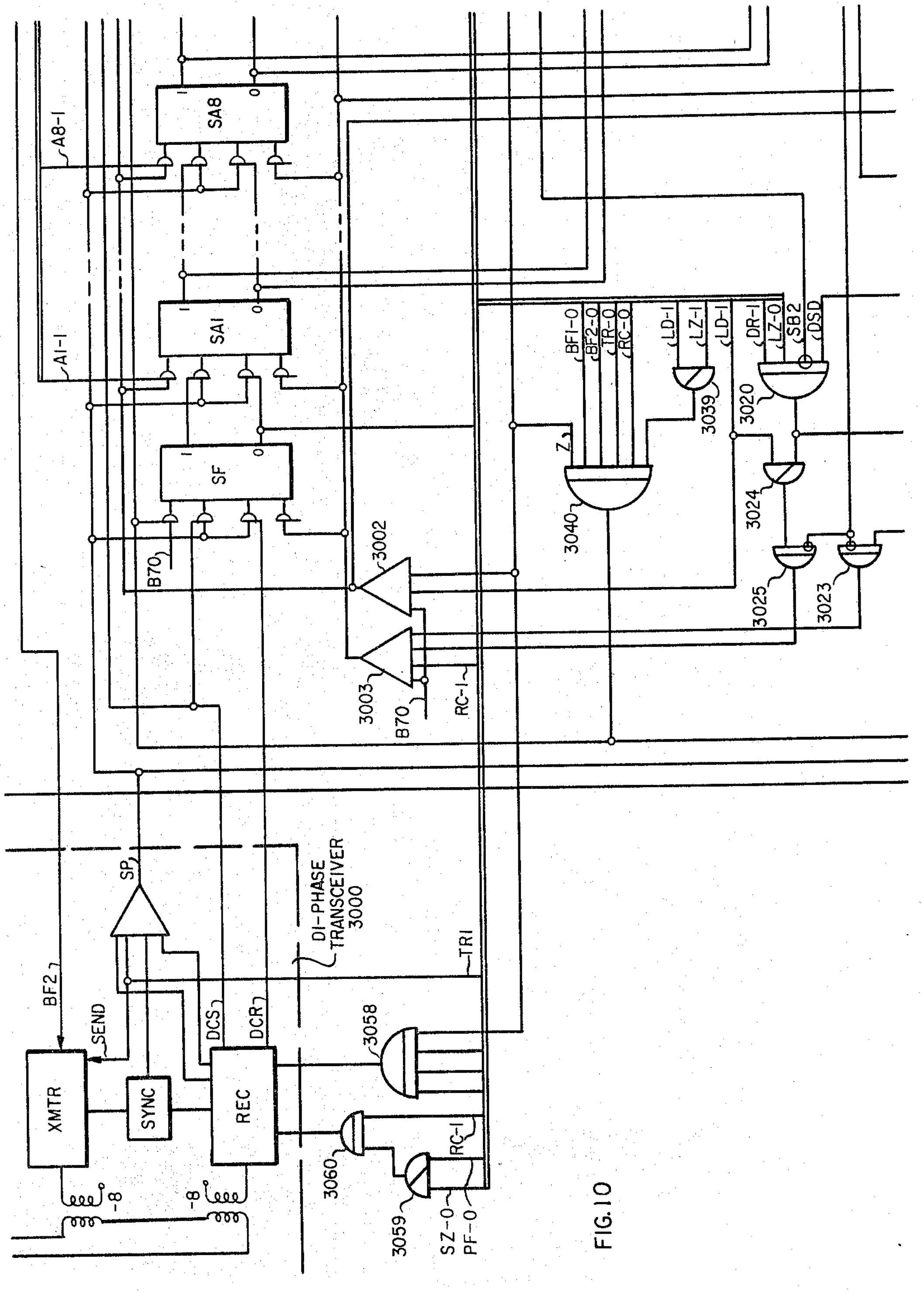
Figure 11:
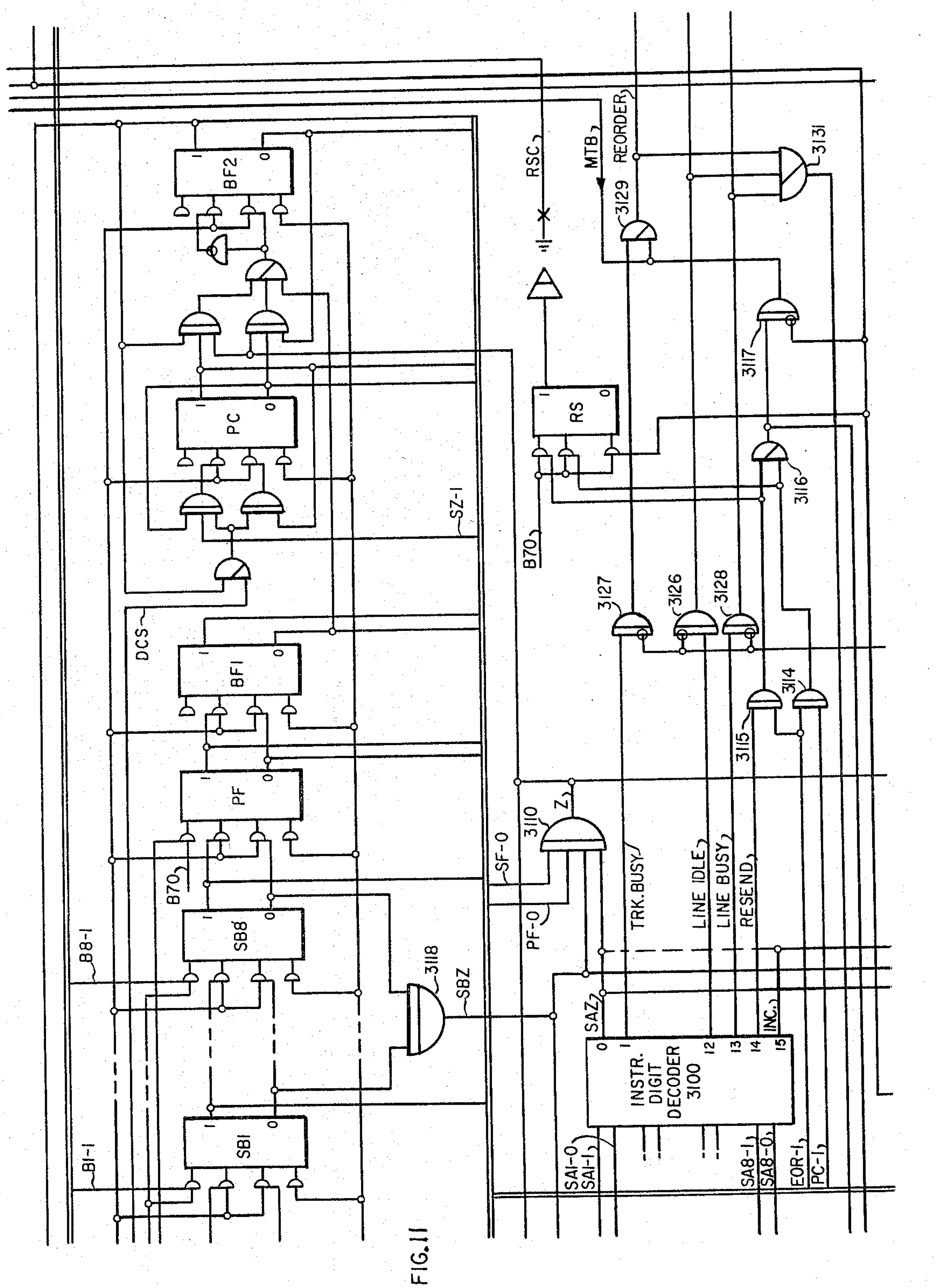
Figure 12:
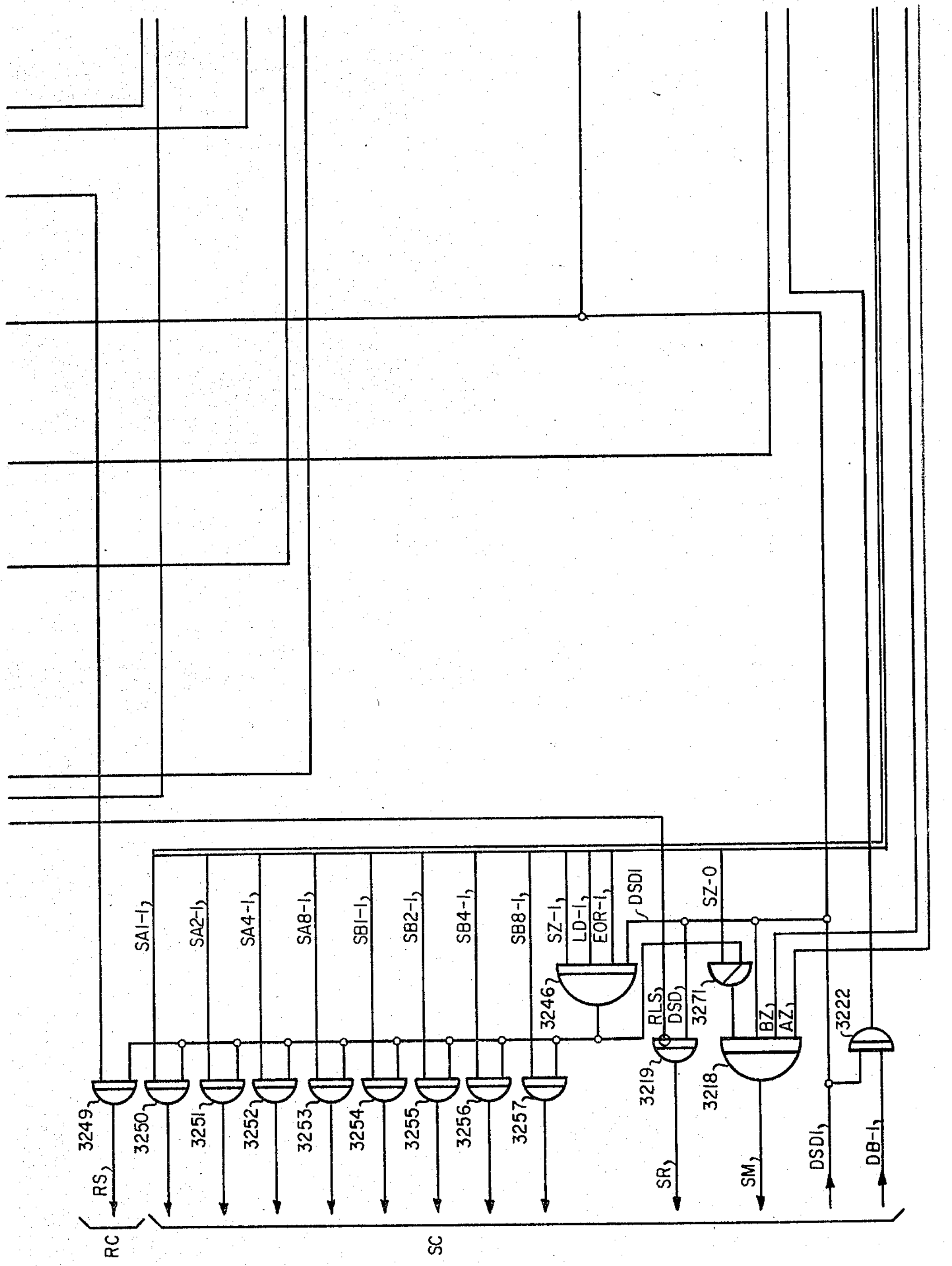
Figure 13:
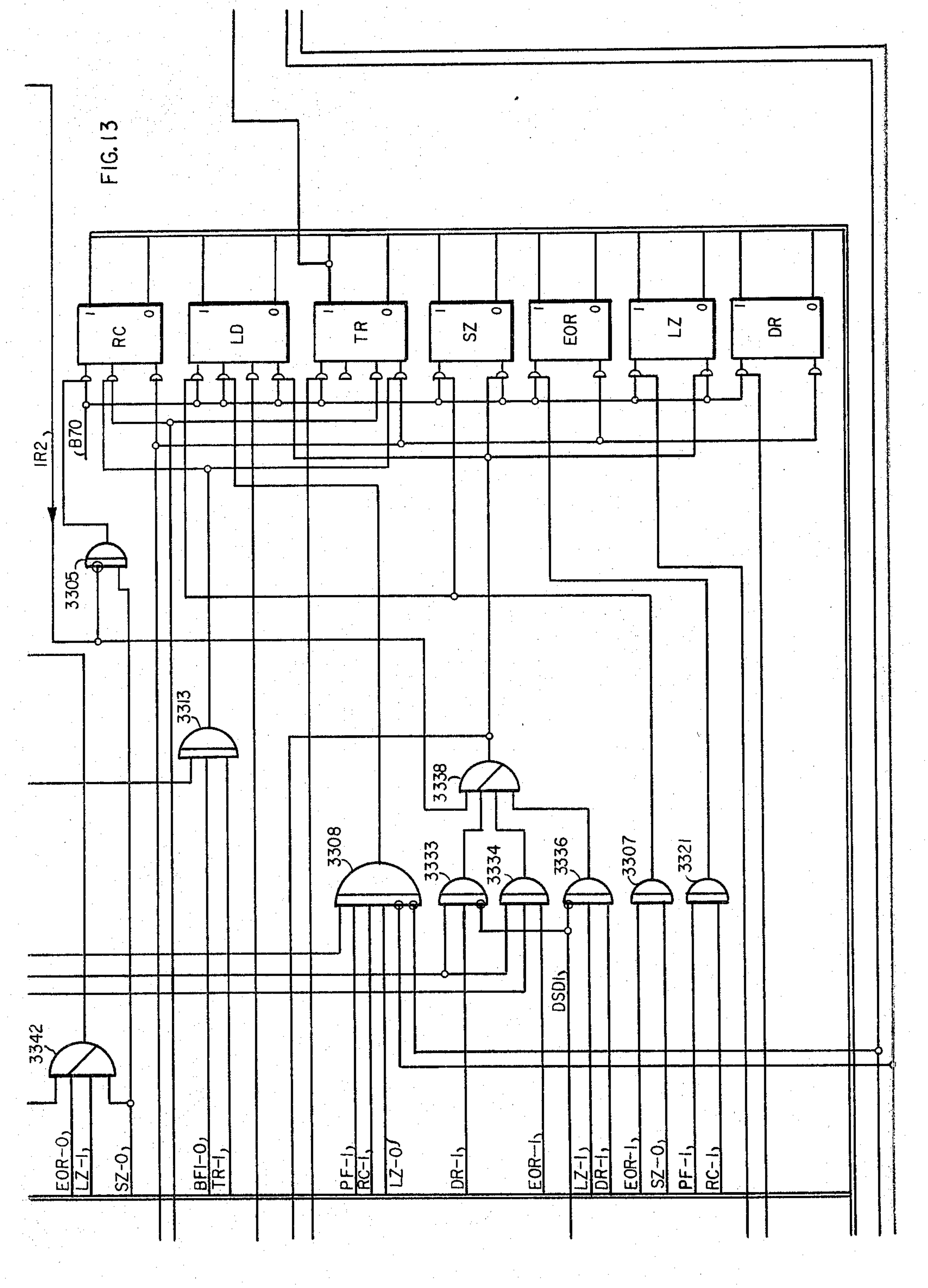
Figure 14:
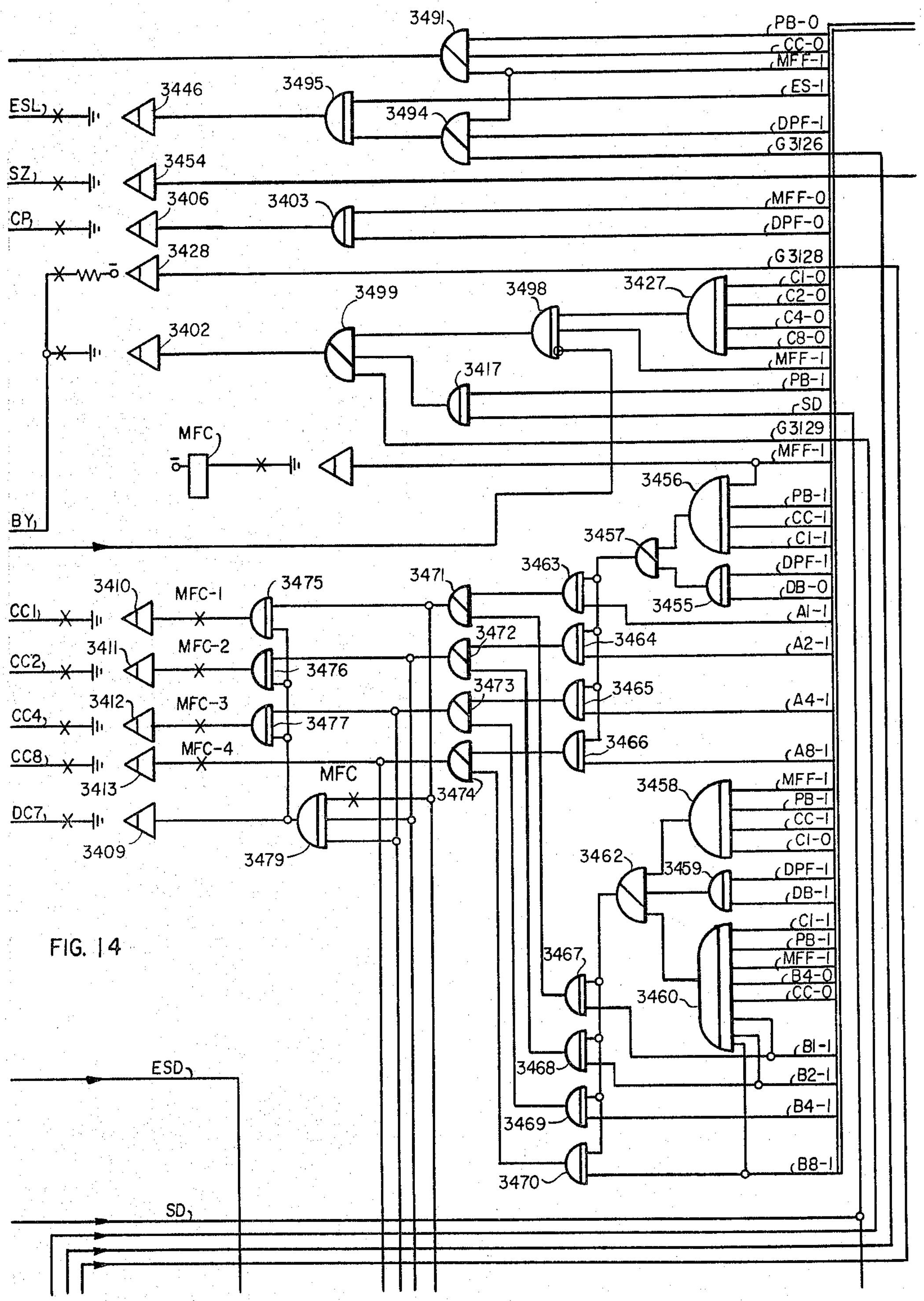
Figure 15:
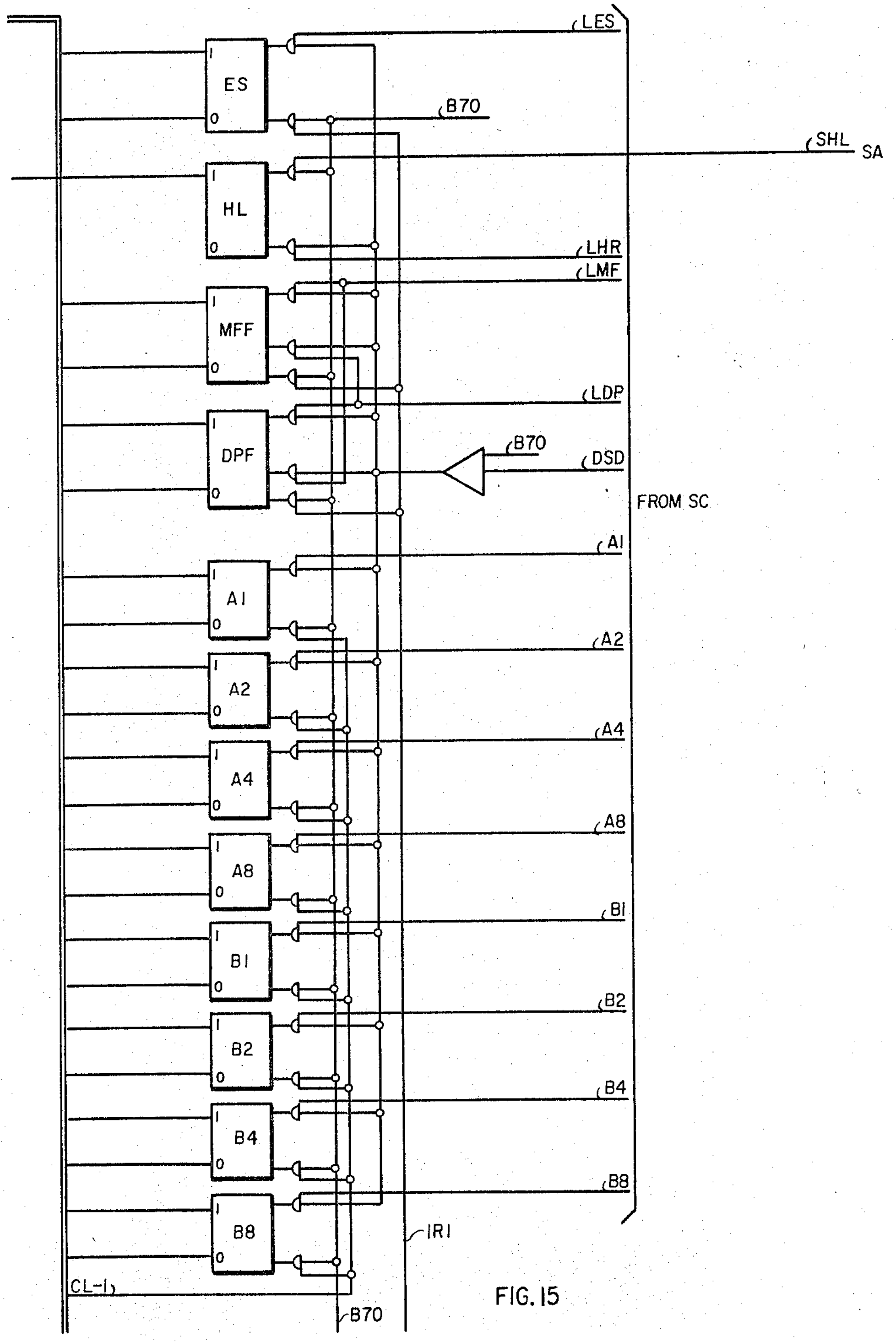
Figure 16:
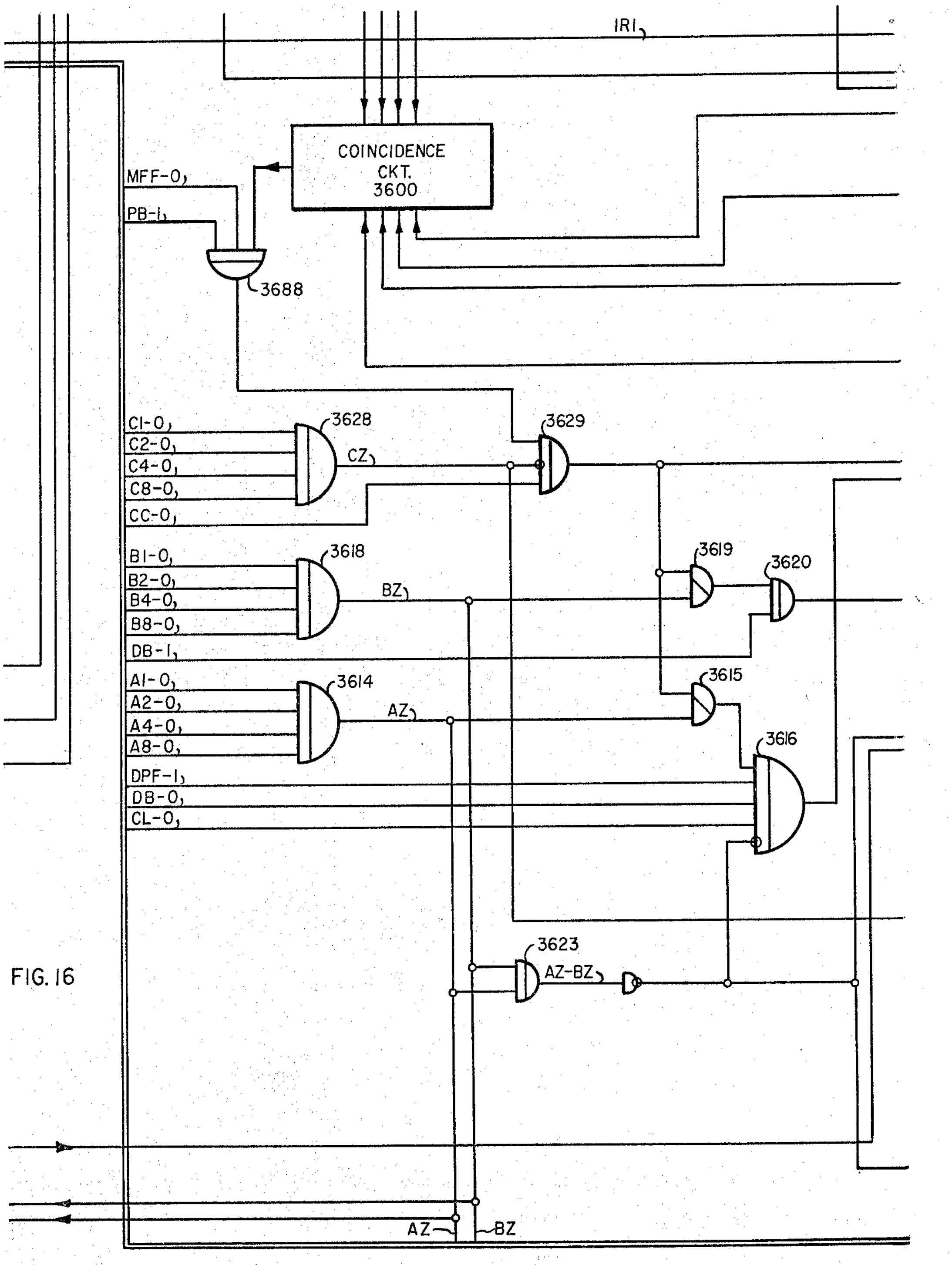
Figure 17:
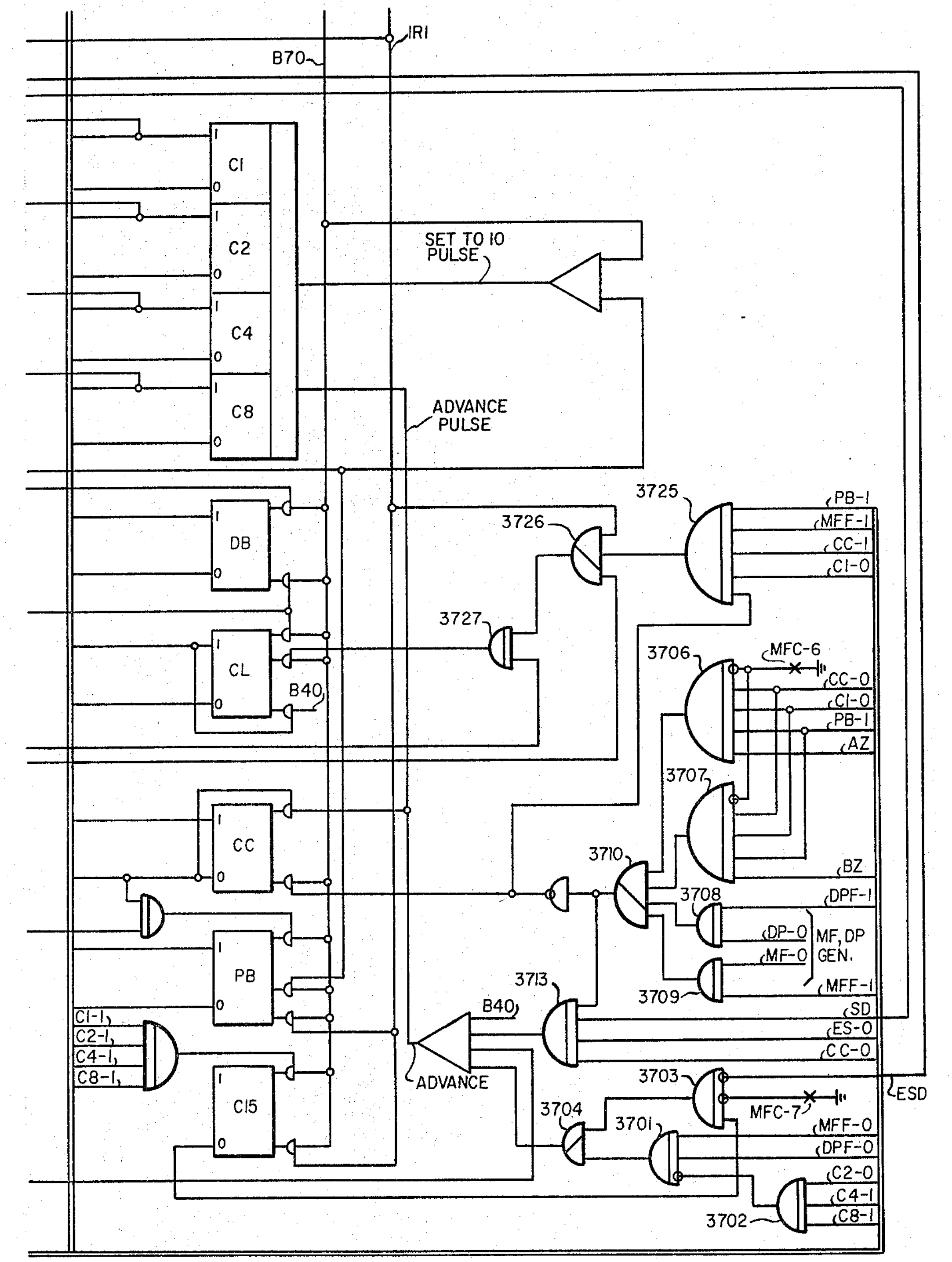

(1) *Loop and switchtrain supervisory unit.*—Referring now to FIGS. 7–9, relays 28H1–2 are the hold relays which provide holding potentials for the various relays in this circuit. Relay 27SZ is the seizure relay which indicates that a connection has been established between the register junctor and the sender. Relay 27SZA operates in connection with relay 27SZ during the seizure sequence and provides a certain amount of delay upon release of the circuit. Relay 27TR is the transfer relay which switches the line loop from diphase sending to the multifrequency and dial pulse mode of sending, and also provides locking ground for relay 27CP while the transfer is being completed. Relay 27CP is the code pulse (diphase) relay which indicates a code pulse call is in progress, and also locks relay 27SD as normally no stop-dial conditions occur during this type of a call. Relay 27SD indicates stop dial condition, informing the sender to stop outpulsing. Relays 28S1–4 count the number of stop dials (three stops dials indicate a busy condition). Relay 28SU is the supervisory relay indicating that a path has been completed to an outgoing trunk.

Relay 28CS is the call signal relay which requests the service of the group selector marker and holds the switch train by extending a ground potential. Relay 28RST is the resend timer which causes relay CS to remove the holding ground from the switch train in the group selector marker, and to provide a 50 millisecond delay that assures a complete release of the switch train, and then to cause relay 28CS to reoperate thereby extending the holding ground for another switch train in the group selector marker. Bipolar relay 28CS is operated via its upper winding and ground via contacts 27SZ–2, thereby causing relay 28RST to operate via contacts 28CS–4. The operation of relay 28RST connects lead MTB to ground potential, thereby indicating a "resend" condition (absence of ground after the resend condition indicates a busy condition). During a resend condition ground on lead RSC in response to flip-flop 31RS and its associated relay driver opposes and releases relay 28CS via its lower winding to release the switch train by removing ground from lead ECH. Relay 28RST remains operated for approximately 50 milliseconds, then releases to open the upper winding of relay 28CS via contacts 28RST–1. Thereupon relay 28CS reoperates all of its contacts, thereby connecting ground potential to lead ECH to provide a holding potential for the new switch train in the group selector and preventing relay 28RST from reoperating by the operation of break contacts 28CS–3.

Relays 29CC1, 2, 4, and 8 and 29DC7 are for the purpose of decoding the binary additive code into the multifrequency signalling code (two out of six), connecting the tone leads to the line so that the two tone leads are always connected to the different sides of the line. Relay 29DC7 symbolizes the digital 7 code.

(2) *Diphase sending controller.*—Referring now to FIGS. 10–13, the diphase sending controller comprises a shift register, diphase transceiver 3000, control flip-flops, and other associated logic. Diphase transceiver 3000 communicates with the line group marker and the group selector marker in a high speed serial manner in connection with the shift register. The shift register comprises eight flip-flops SA1–8 and SB1–8 for two digits of four bits each, suffix bit flip-flop SF, and three prefix flip-flops PF and BF1–2.

The shift register is used to transmit two digits at a time to the markers. From the markers, instruction digits or alternate route instructions are received in the first digit position (flip-flops SA1–8). Ticketing digits may also be received in the second digit position (flip-flops SB1–8).

Flip-flop PC is used in connection with the shift register to determine whether an even number of true indications have been received by the shift register, thereby designating the receipt of valid information. The instruction digit SA1–8 is received from the markers and is decoded by instruction digit decoder 3100 to provide five indications as follows: trunk busy, line idle, line busy, resend, and incomplete. The instruction digit is also transferred to the sender controller by means of logic AND gates 3250–57. The sender controller has the capability of decoding the remaining ten indications regarding alternate route information as shown in the following table:

| Sender: | | Alternate route Instruction to controller |
|---|---|---|
| 1 | Trunk Busy | |
| 2 | | |
| 3 | | MF called number |
| 4 | | DP called number |
| 5 | | DP called number plus 2 digits |
| 6 | | DP called number plus 3 |
| 7 | | MF called number plus 3 |
| 8 | | DP called number less 3 digits |
| 9 | | MF called number less 3 |
| 10 | | DP called number plus 5 |
| 11 | | |
| 12 | Line Idle | |
| 13 | Line Busy | |
| 14 | Resend | |
| 15 | Incomplete | |

Flip-flop RC indicates that the shift register is in the receive state and enables the demodulator in diphase transceiver 3000. Flip-flop TR indicates that the shift register is in the transmit mode and enables the modulator in the diphase transceiver 3000. Flip-flop EOR indicates end of receive and provides synchronism with the diphase transceiver 3000. Flip-flop SZ indicates seizure of the diphase transceiver 3000. Flip-flop LZ indicates load zeros into the shift register for ticketing information. Flip-flop SZ and LZ are used in combination to indicate various conditions as follows: $\overline{SZ}$ $\overline{LZ}$ indicates connect; $\overline{SZ}$ $\overline{LZ}$ indicates the first setting of the shift register and; SZ LZ indicates the second setting of the shift register. Flip-flop DR indicates that digits have been recognized by the sender controller. Flip-flop RS indicates a resend condition as decoded by the instruction digit decoder 3100.

Logic gates 3105, 3113, 3108, 3133, 3138, 3134, 3136, 3107, and 3121 provide set and reset commands for various control flip-flops. Logic AND gate 3118 determines when each of the four ticketing digit flip-flops SB1–8 are reset in the shift register and generates signal SBZ in response thereto. Logic AND gate 3110 indicates that all of the flip-flops in the shift register are in the reset condition and generates logic signal Z in response thereto. Logic inhibit gates 3126–28 allow the trunk busy, line idle and line busy indications to be transferred to the multifrequency and dial pulse controller portion of the sender. These signals are inhibited by logic OR gate 3142 when flip-flops EOR and S2 are reset and flip-flop LZ is set. The output of OR gate 3129 is the "reorder" signal. The reorder command can be generated by the trunk busy indication and also by means of a second resend indication. Ground on lead MTB prevents the first resend signal from being transmitted through OR gate 3129. After the switch train has been released in response to a resend command, ground is removed from lead MTB, so that a second resend signal through OR gate 3129 generates the reorder signal. Gated pulse amplifier 3002 and its associated logic provide the send commands for the shift register and gated pulse amplifier 3003 and its associated logic provide the reset commands for the shift register. Logic AND gate 3219 provides the logic signal SR which indicates that this particular sender is connected to the sender controller. Logic AND gate 3218 generates command SM which indicates to the sender controller a request for more information to be received in the A and B flip-flops. Logic AND gate 3222 is used to set flip-flop DR to indicate that information has been successfully received by the sender controller as there are ten logic commands DSD individually associated with each sender and is multiplexed by the sender controller to identify each sender transmitter. Logic gate 3249 generates a signal in response to resend or parity check to the register via the register controller RC. Logic gates 3060 and 3058 control the receiver and the diphase transceiver 3000.

(3) *Multifrequency and dial pulse controller*.—Referring now to FIGS. 14–17, the multifrequency and dial pulse controller comprises the four A flip-flops and the four B flip-flops which provide a buffer storage area to receive switching digits from the sender controller at a two-at-a-time basis. These digits are then transferred to the shift register for diphase transmission, or they are used for multifrequency or dial pulse outpulsing over the TH and RH leads in FIG. 7. The four stage ring counter C is used in connection with both dial pulse and multifrequency sending. When the dial pulse mode is employed, counter C terminates the outpulsing when the value of the digit in either the A or B store is equal to the value of the count of counter C, thereby generating a coincidence signal from coincidence circuit 3600. Upon coincidence, the counter C is set to the count of ten in response to logic gates 3629 and 3643. Thereupon, counter C counts from 10 back to 0 which provides the interdigital pause. Counter C is advanced in the dial pulse mode in response to logic gates 3713, 3710, and 3708 which respond to the dial pulse generator. These gates simultaneously set flip-flop CC which generates a signal to enable gate 3491 to close the loop for outpulsing. The A digit is outpulsed first under the control of logic AND gate 3459 and the B digit is outpulsed alternately under the control of logic AND gate 3455.

During the multifrequency mode of sending, first the digits stored in the A flip-flops are gated to reed relay drivers 3409–13 under the control of logic AND gate 3456 to enable AND gates 3463–66 to provide the necessary tones for multifrequency (two-out-of-six code) signalling. Logic AND gate 3456 follows flip-flop CC which responds to logic gate 3709. Logic gate 3709 is directly connected to the multifrequency generator to provide the necessary timing intervals for multifrequency sending. During this mode of sending, only flip-flop C1 of counter C is utilized to select first the A store and then the B store for transmission. When the digit B is being outpulsed, logic AND gate 58 controls the operation. Logic AND gate 3460 generates the KP digit which is the digit 11 and is the first digit to be outpulsed.

If a stop dial condition occurs prior to count 15 of counter C during MF sending, at the end of the stop dial, the counter follows A.C. pulse train (18 kc.) under control of gate 3703 to count to 15. Thereupon flip-flop C15 is set to disable the fast operation of counter C, thereby providing no unnecessary delay in the resultant holding of the multifrequency equipment at the distant office.

Logic gate 3703 provides fast operation of the counter C during an end of send condition. During multifrequency operation counter C counts to 12 and then stops due to inhibit gate 3701 and AND gate 3702. The count from 12 to 0 provides a time delay (between 300–400 milliseconds) to allow the distant office to prepare to receive pulses and to return the stop dial indication, when required.

When a blank position in counter C is encountered, AND gate 3706 allows counter C to advance to the next count and logic AND gate 3707 allows the counter to advance for the even position being blank.

Flip-flop ES signifies the end of send condition. Flip-flop HL indicates the hold flip-flop upon seizure. Flip-flop MFF is the multifrequency flip-flop that represents the multifrequency mode of sending. Flip-flop DPF represents the dial pulse mode. Flip-flop DB is the gate-digit-B flip-flop which causes the digit B to be gated from the B store while in the set position and during DP sending allows the digit A to be gated from the A store during the reset condition. Flip-flop CL is the clear indication which resets the A and B store. Flip-flop CC, as mentioned before, is the counter control and provides the timing interval for outpulsing. Flip-flop PB is the pulse blocking flip-flop which when in its reset state prevents outpulsing to provide the interdigital pause while allowing the counter C to remain counting.

Reed relay driver 3496 connects ground potential to lead ESL when an end-of-send condition occurs in response to logic AND gate 3495 and logic OR gate 3494. Reed relay driver 3454 connects ground to lead SZ in response to flip-flop HL being set upon seizure. Reed relay driver 3702 connects ground to lead BY in response to logic gates 3499, 3417, 3798, and 3728 to indicate a trunk busy indication to the register junctor. Reed relay driver 3428 causes resistance battery to be connected to lead BY to indicate a line busy indication, thereby distinguishing line busy and trunk busy. Reed relay MFC is operated in response to a reed relay driver which operates when flip-flop MFF is set.

Logic AND gate 3688 enables the output of the coincidence circuit 3600 when flip-flop MFF is reset and flip-flop PB is set. Logic AND gate 3614 indicates that the A flip-flops are all reset and generate the command AZ. Logic AND gate 3618 indicates that the B flip-flops are all in the reset condition and generate the command BZ. Logic AND gate 3628 indicates that the counter C is reset (count 0) and generates the command CZ.

Logic AND gate 3620 and its associated logic gates set flip-flop CL and simultaneously reset flip-flop DB. Logic AND gate 3616 and its associated logic gates set flip-flop DB. The flip-flop CL may alternatively be set in response to logic gates 3727, 3726, and 3725 during the multi-frequency mode of sending.

*C. Selector marker send-receive circuit*

Referring now to FIGS. 18–19, the send-receive circuit 480 for the group selector marker comprises a shift register, buffer storage area MR, decode logic, control flip-flops, and other logic. The shift register comprising flip-flops SR0–11 receive information from the sender transmitters of the register sender group via diphase transceiver 3800. Flip-flop SR0 is the suffix bit for the shift register and flip-flops SR9–11 are the prefix bits. Flip-flops SR1–8 comprise two digits of information of four bits each. These two digits of information are transferred to the MR storage area and are decoded by decoder AC and decoder BD. The MR storage area is a buffer register which provides temporary storage of received information and the decoders transform this binary information to thereby provide a unique combination of two signals to the route selector circuit for trunk selection. The decoding logic is verified to ensure that both signals have occurred when desired and that none is present after the call has been switched. Information in the shift register and information transferred to the marker register is checked by agreement by utilizing parity check 3960 to generate signal TPA. Parity check 3965 compares the zero side of the flip-flops in the shift register, SR1–0 to SR8–0, with the signals from the sequence and supervisory circuit, SRC1–0 to SRC8–0, in order to generate signal TPB.

Flip-flops PY and XX check for parity between the binary code to be transferred into the shift register and the resultant code in the marker register. The two digits of information of each transmission in the shift register uses a parity bit to provide even parity (even number of binary "ones"). Each transmission received is checked for even parity. Flip-flop EP indicates the transmit mode for the shift register and provides the send command for the diphase transceiver 3800.

Logic AND gate 3819 indicates an all zero condition for flip-flops SR1–8 of the shift register and generates command DZ (digit zeros). Logic AND gate 3924 generates signal DZ in response to flip-flops SR0–9 in the shift register being in the reset condition. Logic AND gate 3925 resets flip-flops EP and XX and also generates command Z for the sequence and supervisory circuit. Logic AND gate 3922 generates signal ZD which requests further information for the sender. Logic AND gate 3916 generates signal PD which verifies that the "connect" instruction has been properly loaded in the shift register.

Logic AND gate 3951 generates signal $\overline{FG}$ in response to both decoder AC and decoder BD being in the zero state. Logic OR gate 3952 generates signal TDL in response to either decoder AC being in the zero state or decoder BD in the zero state. Logic AND gate 3953 generates signal MRZ in response to buffer storage area MR1–8 being in the reset condition.

*D. Line group marker send-receive circuit*

Referring now to FIGS. 20–23, the line group marker send-receive circuit 280 provides a means to communicate with other sections of the system via high speed serial transmission. This high speed serial transmission of data is decoded and processed in the send-receive circuit and is used with the internal marker information (line busy, terminating junctor identity, etc.) to establish a path through the line group matrix. The diphase transceiver 4100 that is used to transmit and receive the high speed information is used in connection with both the LNI shift register and the terminating shift register with relays 41LNI and 41DPT switching transceiver 4100 from the terminating junctor to the register junctor. Furthermore, the send-receive circuit is used to send supervisory signals and to originate subscriber identity (LNI and CS) to other parts of the system.

The send-receive circuit is divided into two major portions: the originating and the terminating circuits. The originating portion comprises the LNI shift register 4011 with the LNI encoder 4010 and logic 4012. The terminating portion of the send-receive circuit comprises the terminating shift register and the associated code conversion logic.

Under the control of the sequence and supervisory circuit, register junctor, and the diphase transceiver 4100, the terminating shift register sends the "start sending," signal to the register junctor and receives and stores the coded diphase information from the register sender group. Logic is provided for loading and sending instructions (i.e. trunk busy, resend, incomplete, etc.) to the register sender group. Logic is also provided for checking parity of the received data (even number for binary "ones" received), which is accomplished by flip-flops TM1 and PR2. These two flip-flops are used for both the originating shift register and the terminating shift register. Logic is also provided to clear and load data into the shift register.

The code conversion for the terminating portion of the send-receive circuit provides logic to store the information received in the terminating shift register and to change the stored binary information into decimal form for use by the other line group marker circuits. This data constitutes the equipment location identity of a line or PBX group to which the call will be terminated and comprises the hundreds decoder HT, tens decoder TT, units decoder UT, and the party digits and wire chief decoder. Special instructions such as verification and wire chief are processed as part of the party digit information. Decoders PH, PT, and PU generate the PBX information. Logic AND gate 4207 generates the connect signal which is sent to the sender when the transmission path is established thereto. Logic AND gate 4210 generates the incomplete and resend command which is decoded by the sender transmitter in the register sender group. Trunk busy, line busy, and line idle are generated by the sequence and supervisory circuit. Logic AND gate 4214 generates signal DZ which indicates all zeros in the shift register. Logic AND gates 4238 and 4229 generate command ZR which is used by the sequence and supervisory circuit.

The LNI portion of the send-receive circuit uses the LNI shift register 4011 to transmit the hundreds, tens, units, class of service, and line group matrix identity of the originating line information to the register sender group. Logic 4012 generates a signal to the register junctor and also receives the "start sending" GO command from the register junctor. Under the control of the sequence and supervisory circuit, register junctor, and the transceiver 4100 information is shifted to the diphase sender for transmission to the register sender group. Prior to the shifting of the last bit of information in the shift register, an error check on the shifted information is performed and the logic detects and corrects the last bit of information such that an even number of even "ones" are transmitted.

The LNI encoder 4010 provides the necessary logic to change decimal information of the other line group marker circuits to binary information for loading of the LNI shift register.

PART 6.—DETAILED OPERATION

A. *Local call*

Assume now that the local subscriber at station 2401 initiates a call to another local subscriber. Upon removal of the handset by the calling subscriber the line marker 200 identifies the line and searches for an idle register junctor. After finding an idle register junctor, such as local register junctor 601, the line marker determines if a path can be established from the calling line to that register junctor. Assuming that this is so, the marker causes crosspoints 2412, 2414, 2416, and 2418 to operate to extend the connection from the line circuit 2410 to originating junctor 2420; and from there to the register junctor 601. At the same time the line marker extends a call signal from the LNI sender 283 in the form of negative battery potential through a relay winding to lead BY and thence to the register junctor 601. In the register junctor, relay 10GO operates over its upper winding, and at its contacts GO–1 ground is extended on lead EC to the buffer-multiplexer 631. This signal is an input to logic 1201 which is individual to the register junctor 601. During the time slot of the associated register an output signal on lead MAL through OR gate 130 and logic 1306 sets the flip-flop EC. If the register receiver is idle, it sequences to the busy state by means of logic 1307 which sets flip-flop BU. Thereupon a GO command is extended to the proper register junctor by means of logic 1303 and gated pulse amplifier 133 to lead SGO, thence through logic 1202 to set the flip-flop 1GO in the register junctor buffer and lead multiplexer. The shift register is reset by a signal from gated pulse amplifier 137. Also the "have register receiver" condition KM is written in the memory in row 1, position E, bit 3. The timer in row 5, position A is started to time the receipt of the LNI information in the shift register of the register receiver 630. The register sequence state RX is advanced from idle to receiving LNI. Relay driver 121 operates, placing ground on lead GO to the register junctor. In the register junctor this ground on lead GO holds the relay 10GO operated. This additional path to ground through the lower winding of relay 10GO reduces the resistance to ground on lead BY, which in the LNI sender 283 causes a relay to operate to connect the diphase sender to the TR and RR leads. The diphase signals are transmitted via leads TR and RR in the register junctor to the leads TDM and RDM to the diphase receiver 139 of the register receiver 630, and into its shift register. This information includes the calling party's equipment location number and class of service. Upon receipt of the entire portion of the information into the shift register, flip-flop PR2 is set causing logic 1309 to set flip-flop CP2. The KM condition is erased from the memory. Flip-flop PR2 causes logic 1310 to move the diphase receiver out of the receive mode. The output of flip-flop CP2, through logic 1308, gated pulse amplifier 134 to lead RGD, and logic 1202 resets flip-flop 1GO; and at the same time through logic 1301 and gated pulse amplifier 131 to lead SHD and through logic 1202 sets flip-flop 1H. Thus the relay driver 120 operates, and relay driver 121 restores. In the register junctor, the removal of ground from lead GO signals the LNI sender of the marker to stop transmission. Relay 10GO restores. Ground on lead H operates relay 10H1, which causes the operation of relays 10H2, 10H3 and 10H4. Negative 8 volt potential is applied to lead ITJ to mark the register junctor busy. Ground potential is applied to lead CR, which holds crosspoint 2418 and operates relay 24JA in series therewith. Ground from relay 24JA holds the cutoff relay in line circuit 2410 and crosspoints 2412, 2414 and 2416 in series. Relay 9A is connected to leads PR and RR and operates over the subscriber's loop. Relay 9DT operates over its upper winding and locks over its lower winding. Dial tone from source DT is connected through contacts DT–3 and the lower winding of relay 9A to the tip conductor TR. Relay 9A at its contacts A–4 sends ground to logic 1201 to record in memory row 1, position B, bit 4 that the subscriber is connected to the P highway. The LNI information is transferred in parallel from the shift register into row 5 of the memory, and upon completion thereof the ANI timer counter in row 5, position A, is turned off. The register sequence state RX advances to dialing.

When the subscriber starts dialing, at the first interruption of the line loop relay 9DT restores to remove dial tone from the line. The counter in row 1, position A and the accumulator in row 4, position A supervises the dialing impulses and records the dialed digit in the accumulator in binary form. When the counter indicates the end of the first digit, the number in the accumulator is transferred to position C in row 4. This digit is shifted down one position each multiplex cycle until it reaches position I, where it is stored. Subsequent digits are similarly received in the accumulator and shifted into their positions in row 4 until three digits have been received, and stored in positions I, H and G. The "request for translator" condition RT becomes true in row 1, position B, bit 3. When the register transceiver 690 becomes idle, its shift register is loaded with the first three dialed digits, processing information comprising a request for code translation and the totals digit; and the class of service information. This information is transmitted to the translator, which processes it and returns with the instructions digit, request for code translation being zero, and the totals digit indicating which one of the number groups stores the information. This information is written into the memory. The instructions digit indicates that the register should wait until seven digits have been received before requesting another translation. When the seven digits have been received the translator is again requested, and the seven digits and the necessary processing information are loaded into the shift register and sent to the translator. The translator returns the sender instructions, and the switching digits, as well as an upgraded set of process digits.

The sender assigner is then requested to assign an idle sender-transmitter, which is shown in detail in FIGS. 7–17.

Assume that sender-transmitter #1 is selected, the sender assigner supplies a signal on lead SHL to set flip-flop HL. Relay driver 3454 operates to supply ground to lead SZ.

Relay 27SZ operates in response to a ground condition on lead SZ and battery via lead ESH and the winding of relay 10ES in the register junctor. Relay 10ES in the register junctor does not operate being a low resistance relay. Relay 27SZA operates in response to ground from contacts SZ–1. Relay 28CS operates from battery over its upper winding, contacts H2–2 and contacts SZA–2 to ground. Only the make contacts of relay 28CS operate at this time. Relay 28H1 operates in response to ground via lead CH and contact SZA–1. This path also provides the holding potential for the register-sender matrix 681. Relay 28RST operates via a path through contacts CS–3, CS–4 and SZA–2. This provides a locking path at contacts RST–1 for relay 28CS. Relay 28H2 operates via contacts CS–2 and locks via its own contacts H2–1 and contacts H1–2.

Relay 27CP operates in response to ground via lead CP from relay driver 3406, which is operated via gate 3403, due to the condition of MMF flip-flop and DPF flip-flop both being in the zero state. The operation of relay 27CP causes relay 27SD to operate, as stop dial conditions do not occur during a local call.

The address of sender transmitter #1 is now stored in the memory of the register handling this call, and logic 2002 generates signal DSD1 during each occurence of the register's time slot. As long as the sender remains seized, as indicated by ground on lead RLS from contacts SZA–3, each occurrence of signal DSD1 at gate 3219 causes signal SR to be generated and supplied to the sender controller.

Ground on lead IR2 from contacts CS–5 is applied through gate 3305 to set flip-flop RC. Since storage positions A and B are empty, signals AZ and BZ are true (also flip-flop SZ has not been set), gates 3271 and 3218 cause signal SM to be generated during DSD1, and sent to the sender controller. Thereupon digits are loaded into the A and B storage positions and signal SM is removed.

Ground potential from contacts of relay 28CS extending through contacts of relays 28H1 and 27TR, via lead ECH, through the register junctor and the originating junctor on lead EC causes operation of relay 25L of the selector inlet. The selector marker, when it recognizes this request for a call, causes all line relays of the group to release except the one associated with this call. The send-receive circuit 480 of the marker is now connected via contacts of relay 25L, and the tip and ring conductors of the line, via the originating junctor, the "R" matrix to leads TS and RS, the register junctor, the RS matrix 681 to leads TH and RH and through break contacts of relay 27TR to the diphase unit of the sender.

The selector marker sequence circuit supplies a "connect" digit (1010 1010) into the shift register which is then sent to the sender shift register. In the sender circuits, the signals PF–1 and RC–1 enable gate 3321 to set the flip-flop EOR. The signals SZ–0 and EOR–1 enable gate 3307 to set the flip-flops SZ and LD. The signals LD–1 via gates 3024 and 3025 along with signal RC–1 enable the gated pulse amplifier 3003 to clear the shift register and reset flip-flop RC. The signal condition (Z BF1–0 BF2–0 TR–0 RC–0 LD–1) enables gate 3040 to set flip-flops TR, PF and SF. At the same time signal LD–1 enables the gated pulse amplifier 3002 to load the shift register and reset flip-flop LD. The signal TR–1 via gates 3726 and 3727 sets the flip-flop CL to clear the A and B storage positions. Flip-flop CL then resets. Signal SM is generated and the sender-controller responds by loading the next two digits in storage positions A and B. The two digits in the shift register are transmitted to the selector send-receive circuit 480.

The selector marker then uses these two digits to identify the level, and to scan for an idle outlet in that level. Assuming that the selected outlet is via crosspoint 2517, the marker causes crosspoints 2513, 2515 and 2517 to operate in series over their lower windings to thereby extend the connection to the terminating junctor; which returns ground on lead C0 to hold the crosspoints in series with the cutoff relay 25C0. The send-receive circuit 480 then transmits a "clear" instruction (0000 0000) to the sender, and the marker releases.

In the sender after the two digits have been sent and the shift register has all zeros, the signal condition (Z BF1–0 TR–1) at gate 3313 resets flip-flop TR and sets flip-flop RC so that the circuit is ready to receive.

When the flip-flop EOR is set at the end of receive, gate 3334 recognizes the all zero condition by the signals SAZ and SBZ being true and via gate 3338 resets flip-flop SZ and also supplies the signal via gate 3023 to enable gated pulse amplifier 3003 to clear the shift register and other flip-flops. The conditions are now the same as at initial seizure so that gate 3305 is enabled to set flip-flop RC. The circuit is now ready to receive from the line group marker send-receive circuit.

When the line group marker recognizes the call signal it causes its send-receive circuit 280′ to transmit a "connect" signal which is received in the sender shift register. When the prefix bit is received gate 3321 sets flip-flop EOR, which enables gate 3307 to set flip-flops SZ and LD. The signals LD–1 and RC–1 enable gated pulse amplifier 3003 to clear the shift register and reset flip-flop RC. Gated pulse amplifier 3002 is enabled to load the shift register and reset flip-flop LD. At the same time the flip-flops TR, PF and SF are set. The signal PR–1 via gates 3726 and 3727 sets flip-flop CL to clear the A and B storage positions, after which flip-flop CL resets. The signal SM at the output of gate 3218 becomes true and is supplied to the sender controller which supplies another two digits into the A and B storage positions, after which flip-flop CL resets. The signal SM at the output of gate 3218 becomes true and is supplied to the sender controller which supplies another two digits into the A and B storage positions.

The two digits which have been loaded in the shift register are transmitted to the line group marker send-receive circuit 280′. When the signal Z becomes true at the end of transmission gate 3313 is enabled to reset flip-flop TR and set flip-flop RC to prepare for receiving.

The line group send-receive circuit returns the signal "incomplete." At the end of reception the output from gate 3321 sets flip-flop EOR. The signal "incomplete" from output 15 of decoder 3100 enables gate 3308 to set flip-flop LD. The signal LD–1 enables gate 3040 to set flip-flops TR, PF and SF and at the same time signal LD–1 enables amplifier 3002 to load the shift register and reset flip-flop LD. The signal TR–1 via gates 3726 and 3727 sets the flip-flop CL to clear the A and B stores, and flip-flop CL resets. The signal SM is generated at gate 3218. The sender controller returns signal LES to set flip-flop ES. The two digits in the shift register are transmitted to the line group marker send-receive circuit 280′. When the signal Z becomes true at the end of transmission the gate 3313 is enabled to reset flip-flop TR and set flip-flop RC to prepare for receiving.

The line group marker now has sufficient switching information to identify the called line, which we have assumed to be at station 2601.

*Line idle*

A busy test is made of the called line, and if it is idle the marker scans for an idle path and if it finds such a path supplies the pull potential to set up the connection. For example the crosspoints 2632, 2634, 2614 and 2612 in matrices E, D, B and A respectively may be operated. The party digit has been supplied via leads TA, TB, TC, and TD and contacts of relay TKS to the terminating junctor to designate the ringing signal.

In the meantime the send-receive circuit 280′ transmits the instruction "line idle" to the sender.

A ringing signal is transmitted to the called line and ringback tone is transmitted to the calling line from the terminating junctor (see U.S. Patent 3,170,041 for details of how this is accomplished). The call from now on is supervised by the terminating junctor.

The line idle signal from output 12 of decoder 3100 via gate 3126 and gate 3494 is supplied to gate 3495, which in coincidence with signal ES–1 enables relay driver 3446. This supplies ground on lead ESL which causes relay 27SZ to restore. This causes the other relays in FIGS. 27, 28 and 29 to restore. The signal is also forwarded via lead ESH to the register junctor to cause it to release. A signal is also supplied via gate 3131 to gate 3023. At the end of receive the signal at gate 3334 becomes true and is supplied via gate 3338 to gate 3023. The output of gate 3023 then enables gated pulse amplifier 3003 to reset the shift register and other flip-flops.

*Line busy*.—If the called line is busy, the line group send-receive circuit will return a "line busy" instruction instead of "line idle," which in the sender appears at output 13 of decoder 3100. This signal via gates 3128, 3131, and 3023 enables amplifier 3003 to clear the shift register and reset other flip-flops. From gate 3128 the signal is also supplied to operate relay driver 3428, which connects battery potential lead BY. The register junctor recognizes this signal to release the register and the sender. Busy tone is supplied to the calling party from the terminating junctor.

*Resend*.—The resend feature according to the invention makes use of a special reed-type relay 28CS of the type disclosed in my copending U.S. patent application for a Control Circuit, Serial No. 204,936, filed June 25, 1962 now Patent No. 3,210,615. The resend feature also makes use of a relay 28RST which has a shorted winding for slow release. It will be recalled that upon initial seizure of the sender, relay 28CS operated by its upper winding and contacts H2–2 and SZA–2. This causes only the make contacts of relay 28CS to operate. The ground from contacts SZA–2 then extends through contacts CS–4 and CS–3 to operate relay 28RST. This provides a holding path for relay 28CS via contacts RST–1 after relay 28H2 operates. Ground from contacts RST–2 extends via lead MTB to the diphase controller circuit to override any output signal from gate 3117, and thereby prevent such signal from reaching the reorder lead at the output of gate 3129.

Either marker after receiving switching digits may return the "resend" instruction in place of one of the other instructions when transmission occurs from a marker send-receive circuit to the sender diphase transceiver. This signal will appear at output 14 of decoder 3100 and applied to gate 3115. Also the sender itself may generate the resend command. For example if the diphase transceiver upon the receipt of signals does not have parity, the signal PC–1 enables gate 3114. It is also possible to generate the resend command in response to any other fault condition, although not shown in the drawings herein. In any case at the end of receive the signal EOR–1 enables both gates 3114 and 3115, and the output from either of these gates will set the flip-flop RS and apply a signal through gate 3116 to gate 3117. As already noted the signal at the output of gate 3117 is not effective because its output is grounded by lead MTB. Flip-flop RS operates a relay driver to apply ground to lead RSC. Relay 28CS now has both of its windings energized, and because they are differentially wound the relay restores. This removes ground via contacts CS–4 from relay 28RST, and also removes the call signal ground at contacts CS–1 from lead ECH. This causes the terminating switch train to release. For example if the connection has been extended to the terminating junctor of the called line group, removal of ground from lead ECO at the input of the terminating junctor causes the terminating junctor to release, which in turn removes ground from lead CO which causes the selector to release. After approximately 50 milliseconds relay 28RST restores, which removes the ground potential from the upper winding of relay 28CS, and also removes ground from lead MTB. The ground on lead RSC to the lower winding is now effective to cause relay 28CS to operate all of its contacts, thereby reapplying ground at contacts CS–1 to lead ECH to again operate the line relay 25L in the selector inlet circuit.

The resend signal from the output of gate 3116 is also supplied to gate 3249, so that upon appearance of the signal DSD1 the signal RS is transmitted to the register controller. This causes the register to return to the beginning of the sender sequence operation, so that a completely new attempt is made using this same sender transmitter to complete the connection.

Since break contacts CS–3 are operated to their open condition relay 28RST now remains restored, and there is no ground on lead MTB. Therefore if a second resend command occurs it will be supplied via gate 3117 and gate 3129 to generate the reorder signal, which is in turn applied via gate 3499 to operate the relay driver 3402.

*Trunk busy.*—If a "trunk busy" instruction is returned via one of the markers it appears at output 1 of decoder 3100 and via gates 3127 and 3129 generates the reorder signal. This signal via gate 3499 operates relay driver 3402 to apply ground potential to lead BY. This signal is transmitted via lead BYH to the register junctor, where it is recognized and among other things applies ground via the lead BY through crosspoint 2418 of the "R" matrix to operate relay 24BT in the originating junctor. At this point 120 i.p.m. busy tone is returned to the calling line. The register and the sender are released.

Note that if three stop dial indications are counted by relays 28S1–4, this designates that the trunk is busy at the distant office, and ground is applied via contacts S2–1, S1–2, S4–1, and S3–1 to lead BYH. This causes 120 i.p.m. busy signal to be supplied to the calling line, and the sender and register to release.

B. *Outgoing call*

The operation for an outgoing call is the same as that for a local call down to the point at which the sender transmits two switching digits to the group selector send-receive circuit 480. The selector marker may establish a connection via a primary route, or if it finds that it is unable to do this it may itself select an alternate route and establish the connection accordingly. Also the outgoing trunk selected may or may not require ticketing. Assuming that the outlet selected is via crosspoint 2517 the selector marker operates crosspoints 2513, 2515 and 2517 in series over their lower windings. The outgoing trunk circuit applies ground to lead C to hold these three crosspoints over their upper windings in series with the cut-off relay 25CO.

If this outlet is via the primary route and there is no ticketing information the selector send-receive circuit 480 will merely return the "clear" signal which will be recognized at gate 3334 by the signals SAZ and SBZ being true at the end of receive, and a signal will be supplied via gate 3338 and gate 3223 to the gated pulse amplifier 3003 to reset the shift register and other of the flip-flops.

If the selector was unable to complete the connection via the primary route and has selected an outlet via an alternate route, the send-receive circuit 480 returns an alternate route digit in the first position of the shift register. Flip-flop SZ remains set so that signal SZ–1 is true. Also end of receive has occurred so that signal EOR–1 is true, and signal LD–0 is true so that in the time slot of the register when signal DSD1 becomes true gate 3246 is enabled, which in turn enables the gates to the sender controller so that the alternate route digit is transmitted via gates 3250–3253 to the sender controller for storage in the memory. The sender controller to acknowledge recognition of the digits sends the signal on lead DB–1 which via gate 3222 sets flip-flop DR. Since there is no ticketing digit, signal SBZ is true. The signal DSD1 inhibits gate 3333 until after the end of the register time slot. Then in response to the signals SBZ and DR–1 gate 3333 is enabled to reset flip-flops SZ, DR and LD, and also to supply a signal via gate 3023 to enable gated pulse amplifier 3003, which resets the shift register and other flip-flops of the diphase controller.

If the connection is via a trunk which requires ticketing, the group selector identity will appear in the second position of the shift register (SB1–SB8). In this case also at the end of receive when the time slot of the register occurs we have the signal condition (SZ–1 LD–0 EOR–1 DSD1) to enable gate 3246 and this signal is supplied to gates 3249–3257. The ticketing digit identifying the selector group is supplied to the sender controller from gates 3254–3257. There may or may not also be an alternate route instruction digit, and if there is it is also supplied to the sender controller from the output of gates 3250–3253. The sender controller upon recognition of the digits returns the signal DB–1 which via gate 3222 sets flip-flop DR. At gate 3020 the signal SBZ is not true so it does not inhibit the gate and the other inputs thereto are all true. The output from gate 3020 sets flip-flop LZ, and also via gate 3024 and 3025 is supplied along with signal RC–1 to enable gated pulse amplifier 3003 to reset the shift register and other flip-flops. The signal LZ–1 via gate 3039 is supplied to gate 3040. All of its other inputs being true, gate 3040 is enabled to set flip-flops TR, SF and PF. There is no A.C. set signal to the other flip-flops of the shift register, and therefore we have a load zero condition. This signal is transmitted to the selector send-receive circuit 480 which returns two additional ticketing digits identifying the particular outlet from the selector. At the end of receive and in the time slot of the register gate 3246 becomes enabled to supply the input control to the gates 3249–3257 and the two digits are sent to the sender controller from the outputs of gates 3250–3257. The sender controller upon recognizing the digits returns the signal DB–1 which via gate 3222 sets flip-flop DR. After signal DSD1 becomes false the signals LZ–1 and DR–1 enable gate 3336 which via gate 3338 resets flip-flops SZ and LZ, and also via gate 3023 enables gated pulse amplifier 3003 to reset the shift register and other flip-flops. The diphase controller is now cleared.

Note that on a ticketing call the selector transceiver transmits to the sender diphase transceiver three times, and that the flip-flops SZ and LZ together count these receptions. During the first reception, which is the connect signal, flip-flops SZ and LZ are both in the reset condition; during the next reception which is the first set constituting the alternate route and first ticketing digit flip-flop SZ is in the set and flip-flop LZ is in the reset condition; during the next reception which is the second set of ticketing information both flip-flops SZ and LZ are in the set condition.

*Dial pulse and multi-frequency sending controller.*—On outgoing calls, after the last two digits required to establish the connection to the outgoing trunk have been sent by the transceiver and the sender requests additional digits, the sender controller signals the sender to switch to dial pulse mode by a signal on lead LDP to operate the flip-flop DPF, or multifrequency mode by a signal on lead LMF to operate the flip-flop MFF, as may be the case. At the same time digits from the sender controller are loaded into the A and B flip-flops. Relay driver 3406 restores to remove ground from lead CP, which permits relay TR to operate in series with relay CP before relay CP restores. Relay TR locks at its own contacts, and at other contacts transfers the line leads TH and RH from the diphase transceiver to the repeat coil and the loop supervisory relay SU, so that the dial pulse or multifrequency pulse train may be transmitted to the outgoing loop.

The sending operation centers around the counter C, which has a normal position in count 12.

(1) *Dial pulse call.*—Assuming the call is to be dial pulsed, when the trunk connect signal is recognized by operation of the loop supervisory relay SU and no stop dial indication exists, the counter starts advancing one count on each on-hook period of the dial pulse train at lead DP, using gates 3708, 3710, 3711, 3713, and 3738 to control flip-flop CC and counter C by the pulse train on lead DP. At gate 3491 the signal on lead PB–0 is continuously true at this time, so that the relay driver 2893 remains operated and keeps the loop closed. Therefore the outpulsing does not commence until the counter passes through count 15 into count 0, at which time the signal CZ at the output of gate 3628 becomes true. When the flip-flop CC is in the reset state the D.C. set input to flip-flop PB is enabled to set this flip-flop upon the occurrence of signal B70, thereby removing the pulse blocking condition at gate 3491. The count from 12 to 0 provides time delay (between 300–400 milliseconds) to allow the distant office to prepare to receive pulses and to return the stop dial indication, when required. If this indication is returned, relay SD operates and through contacts of relay SU supplies ground on lead SD, which inhibits gate 3713 so that the counter remains in the count at which the stop dial has occurred until it is removed.

There is storage for two digits in stores A and B. The two digits are outpulsed alternately (starting with the A position), if both positions have a digit stored in them. If only the B store has a digit, and the A store is blank, the signal AZ at the output of gate 3614 is true and causes flip-flop DB to be set via gates 3615 and 3616 upon the occurrence of signal B70 which immediately enables the circuit to transmit the B digit. At all times, when leaving the even position, the stored digits are erased and the sender controller is requested to supply additional digits.

Assuming that digits are present in both storage positions, when the flip-flop PB operates upon reaching the off-hook period of the count 0, the loop control gate

3491 is enabled and the output from the coincidence circuit is enabled at gate 3688. The signal on lead DB–0 is true and enables the gates 3463 to 3466 via gates 3455 and 3457 from the A store to the coincidence circuit. From this point the line loop is controlled by the output from flip-flop CC at the gate 3491 with the line loop being open during each on-hook period of the pulse train. When the coincidence between the digits stored in the A position and the digit in the counter is recognized, the signal from the coincidence circuit through gate 3688 and through gates 3629 and 3643 causes the counter C to be advanced to count 10 upon the next occurrence of pulse B70, and this same signal resets flip-flop PB. The coincidence signal from gates 3629 and 3643 through gates 3615 and 3616 also sets the flip-flop DB, to thereby disable the gate 3455 and enable the gate 3459 so that the coincidence circuit views the B digit. With flip-flop PB reset the output from the coincidence circuit is inhibited and gate 3491 remains true to lock the pulse repeating relay driver 2893 in the closed position, thereby preventing further pulsing. The counter C now continues stepping from count 10 up to count 0 (unless the stop dial occurs to inhibit gate 3713 in which case it will wait until it is removed). Counts 10 through 0 provide approximately 640 milliseconds interdigital pause. When count 0 is reached the operation is essentially repeated to transmit the digit from the B position.

At the end of the transmission of the B digit the coincidence signal at the output of gate 3643 through gate 3619 in conjunction with the signal on lead DB–1 being true enables gate 3620 to rest flip-flop DB and to set flip-flop CL. The signal CL-1 causes the flip-flops of stores A and B to be reset, which causes the signals AZ and BZ at the outputs of gates 3614 and 3618 respectively to become true, together with the output from gate 3623. Flip-flop CL also resets. (It may be noted here that as long as there is no digit in either A or B postion (AZ BZ) the gated pulse amplifier 3738 is not enabled so that the counter cannot advance. This will not normally effect the counter, since the maximum time from the request for the digit until the digits are delivered is only 20 milliseconds, except in the cases of early outpulsing when digits to be sent out may not as yet have been dialed by the subscriber. In the latter case the counter will not be advanced until the digit becomes available.) The signal SM is generated to transmit a request for additional digits to the sender controller. The succeeding digits will be outpulsed in a similar manner. After the last digit has been outpulsed and this circuit requests additional digits, the sender controller indicates by signal LES, which sets flip-flop ES, that no digits remain to be outpulsed. These conditions cause the sender to release. The counter C advances until it reaches count 12, and the output from gate 3702 inhibits gate 3701 which removes the enabling signal from the lower input of gated pulse amplifier 3738.

(2) *Multifrequency sending.*—The initial operation for multifrequency sending is similar to that of dial pulse sending. The counter starts from count 12, but follows the MF pulse train at gate 3709 (nominally 7 pulses per second 50% duty cycle). The sending does not begin until count 1 is reached. The period of count 12–16 provides 500–640 milliseconds delay to allow the distant office to prepare for the receipt of digits and to return the stop dial condition. Stop dial is always expected from offices equipped to receive MF tones. If count 16 is reached and no stop dial condition has occurred, this circuit signals "reorder" to the register junctor and the sender is released.

If the stop dial occurs prior to count 15, at the end of the stop dial, ground on lead ESD enables gate 3703 and 3704 to advance counter C by means of gated pulse amplifier 3738 by following A.C. pulse train (18 kc.) to count 15. This feature is provided to avoid unnecessary delays in the resultant holding of the MF equipment at the distant office. At count 15 flip-flop C15 is set which inhibits gate 3703.

Either both positions or only one of the two stores may contain digits, which is the same as the case for dial-pulse sending. If digits are always available in both positions, a digit is sent on each count of counter C; the digit in store A is sent on the odd count which corresponds to C1 being true, the digit in store B on the even count. In each count the 70 millisecond tone-on period is followed by a 70 millisecond tone-off period (assuming 7 pulses per second, 50% duty cycle). Sending from store A is controlled by gate 3456 and sending from store B is controlled by gate 3458. The exception to the above is the KP digit, which is always the first digit to be sent, is always stored in position B, and the tones for this digit are connected to the line during the tone-off period of count 1 the tone-on period of count 2 (140 milliseconds).

After the counter has advanced to 15 setting flip-flop C15 and thereby inhibiting gate 3703, the advance control for counter C is resumed by the MF pulse train in gate 3709. In counter state zero flip-flop PB is set, thereby supplying input signals to gates 3456, 3458, and 3460 so that sending can commence. Sending is accomplished by relay drivers 3409 to 3413 which are connected through various gates to the A and B stores. The KP digit has the value 11 and is gated through gates 3467 to 3470 under the control of gate 3460 which is enabled by the KP digit itself and continues through count 2 by means of gate 3458 during the tone-on period of count 2.

At the begining of the tone-off period in each even count, flip-flop CL is set in response to gates 3725, 3726, and 3727, thereby causing the storage positions to be cleared and the sender controller is requested for additional digits by the generation of signal SM. The digits are received during the same tone-off period from the sender controller. The next digits are sent from stores A and B alternately under the control of gate 3456 during the odd count and gate 3458 during the even count.

If only one position contains a digit, the counter remains in the count associated with the blank position only momentarily and then advances to the next position. If the digits are placed in both positions, the counter will continue folowing the MF pulse train during the tone-on period of count 3, the digit in the on position is gated and during the tone-on period of count 4 the even position is gated. Upon the tone-off period of count 4 the digit is cleared from the storage and the new digits are requested.

When a blank position is encountered gate 3706 allows the counter C to advance to the next count and gate 3707 allows the counter to advance for the even position being blank.

While the arrangement shown herein provides that each sender transmitter of the group is universal by providing the three modes, code pulse, dial pulse, and multifrequency; it is apparent that the individual senders can be specialized as to mode, in which case the group of senders would still provide the universal requirement.

While we have described above the principles of our invention in connection with specific apparatus, it is to be clearly understood that this description is made only by way of example and not as a limitation to the scope of our invention. Patent No. 3,170,041 by K. K. Spellnes, for Communication Switching System, issued February 16, 1965, covers features of the switching system described herein, and in Columns 33–35 thereof lists other related patent applications, some of which cover features disclosed herein. This list is made a part hereof as though fully set forth.

What is claimed is:

1. In a communication switching system a plurality of switching stages for extending connections between calling and called lines with marker apparatus for controlling the establishment of connections through said switching stages comprising:

a plurality of sender units, each sender unit including semiconductor gates and semiconductor flip-flops for sending in a local mode and for sending in a plurality of outpulsing modes, there being a switching digit storage set and a mode indication set of said flip-flops, means to receive and store a portion at a time of the switching digit information for a call for storage in said switching digit set and the corresponding mode information for storage in said mode indication set, and pulse generating means to produce output pulses in any of said outpulsing modes in accordance with the information stored in the mode indication set, all of the switching digit information stored at one time in the switching digit set being sent in the same mode, with the mode being independent for switching digit information stored in the switching digit set at different times in the same call, so that the local mode and a plurality of outpulsing modes may be used during one call;

said switching stages including selector groups;

marker apparatus including selector marker apparatus associated with the selector groups;

a plurality of outgoing trunk means;

a sender unit for first transmitting coded switching digits in the local mode to the selector marker apparatus requesting an outgoing trunk means to cause a connection to be established through the selector group to one of said outgoing trunk means;

and means for selecting one of the outpulsing modes to transmit additional switching digits from said sender unit over the connection through the selector stages to a distant office.

2. In a communication switching system, the combination as claimed in claim 1, wherein said distant office is a tandem office which responds to the receipt of switching digits to establish a tandem connection to another office, means in the sender unit for changing the selection of outpulsing mode to transmit additional switching digits to said other office.

3. In a communication switching system, the combination as claimed in claim 1, wherein said marker apparatus further includes line marker apparatus associated with the line groups;

and wherein the switching digits are transmitted from the sender unit in the local mode to the selector marker apparatus alternatively requesting a line group to cause a connection to be established through the selector stages to one of said line groups;

and means for selecting the local mode to transmit additional switching digits from said sender unit over said connection through the selector stages to the line marker apparatus to cause a connection to be established through the line group to cause the completion of the connection to the called line.

4. In a communication switching system, a sender unit comprising:

a cyclic counter having steps one through ten inclusive in which output pulses may be produced, and a plurality of other steps eleven to zero inclusive;

a counter control bistable device;

a source of driving signals which alternate between a first and a second level;

a driving arrangement to set the control device to a first state and advance the counter once each time the driving signal is at the first level, and to set the control device to a second state once each time the driving signal is at the second level;

digit storage apparatus;

means for entering a digit into the storage apparatus;

means for producing one output pulse at each step of the counter, a coincidence detecting arrangement for comparing the step of the counter with the digit in the storage apparatus to generate a coincidence signal when they correspond;

means made effective in response to the coincidence signal to block production of further output pulses while the counter is advanced through other steps including eleven through zero once for each occurrence of the first level of the driving signal, to thereby produce an interdigital interval.

5. In a communication switching system, the combination as claimed in claim 4, wherein said means for blocking production of output pulses includes a pulse blocking bistable device, means for setting it to a first state in response to coincidence of the counter in the zero step and the control device in its second state, means for generating an end-of-digit signal responsive to coincidence of (1) said concidence signal, (2) the pulse blocking device being in its first state, (3) the counter being off zero, and (4) the control device being in its second state;

means responsive to the end-of-digit signal for setting the counter to ten, and means also responsive to the end-of-digit signal for setting the pulse blocking device to its second state, said means for producing output pulses including means for generating an output pulse during coincidence of the control device being in its first state and the pulse blocking device being in its first state.

6. In a communication switching system, the combination as claimed in claim 5, wherein said digit storage apparatus includes two digit storage positions, means for selectively coupling one or the other of the digit positions to said coincidence detecting arrangement, including a digit selecting bistable device, the first digit position being selected when the digit selecting device is in a second state and the second digit position being selected when the digit selecting device is in a first state;

means for initially setting the digit selecting device to its second state when the first digit position is selected and a series of output pulses is produced designating the first digit, a digit-clearing bistable device, means responsive to the digit selecting device being in its second state and the clearing device being in its second state for setting the digit selecting device to its first state so that after said interdigital interval and the counter passing through the zero step a train of pulses is produced designating the digit from the second position, means responsive to said end-of-digit signal and the digit selecting device being in its first state for simultaneously setting the digit selecting device to its second state and the digit clearing device to its first state, means responsive to the digit clearing device being in its first state for clearing the digits from said digit storing apparatus, the digit clearing device being returned to its second state, means responsive to the cleared condition of the storage apparatus for causing additional digits to be entered therein so that they will in turn be used to control the production of output pulse signals.

7. In a communication switching system, the combination as claimed in claim 6, further including means effective when a digit position is blank and the digit selecting device is in the corresponding state, to change the state of the digit selecting device.

8. In a communications switching system, a sender unit comprising:

a cyclic counter;

a counter control bistable device;

a source of driving signals which alternate between a first and a second level;

a driving arrangement to set the control device to a first state and advance the counter once each time the driving signal is at the first level, and to set the control device to a second state once each time the driving signal is at the second level;

digit storage apparatus;

means for entering a digit into the storage apparatus;

means for producing one output pulse at each step of the counter, a coincidence detecting arrangement for comparing the step of the counter with the digit in the storage apparatus to generate a coincidence signal when they correspond;

means made effective in response to the concidence signal to block production of further output pulses while the counter is advanced through other steps once for each occurrence of the first level of the driving signal, to thereby produce an interdigital interval;

means for stopping said counter in an intermediate one of said other steps, means responsive to an enabling signal for disabling said stopping means and causing said counter to be advanced by said driving arrangement once for each occurrence of the first level of the driving signal, the pulse blocking means being effective while the counter is advanced through the remaining ones of said other steps; whereby a seizure interval is obtained during which no output pulses are produced.

9. In a communication switching system, the combination as claimed in claim 8, further including means for detecting a stop dial signal and for inhibiting said driving arrangement to stop the counter as long as said stop dial signal exists; whereby the production of output pulses cannot be initiated during the existence of the stop dial signal.

10. In a communication switching system, the combination as claimed in claim 8, wherein output pulses may be either a dial pulse of a multifrequency mode, a dial pulse mode bistable device and a multifrequency mode bistable device, one or the other of the last two said bistable devices being set to a first state as required for designating that output pulses are to be produced in a corresponding mode, there being two sources of said driving signals one for dial pulse mode and the other for multifrequency mode; gating means which is effective in response to one of said mode designating bistable devices being set for coupling the driving signals from the corresponding source to the driving arrangement, so that the counter is advanced in accordance therewith; the sender unit being so constructed and arranged that in dial pulse mode output pulses designating one digit are produced for each cycle of the counter, and in multifrequency mode an output pulse designating one digit is produced for each step of the counter, the coincidence detecting arrangement being inhibited when the multifrequency mode bistable device is in its first state.

11. In a communication switching system, the combination as claimed in claim 10, further including means for advancing the counter at a rate which is very fast compared to either of said driving signals, means responsive to an end-of-stop-dial signal with the multi-frequency mode bistable device set for enabling said fast advance means until the counter has advanced through the remaining of said other steps, whereby output pulses may be produced quickly after the end-of-stop-dial signal indicates that they may be received.

12. In a communication switching system, the combination as claimed in claim 10, wherein said digit storage apparatus includes two digit storage positions, means for selectively coupling one or the other of the digit positions to said coincidence detecting arrangement to select a position for generating output pulses during the dial pulse mode.

a bistable device in the cyclic counter for selectively coupling one or the other of the digit positions to multifrequency output pulsing equipment.

13. In a communication switching system, the combination as claimed in claim 12, further including separate means for each mode effective when a digit position is blank and the digit selecting device is in a state corresponding to the blank position, to change the state of the digit selecting device.

14. In a communication switching system, the combination as claimed in claim 12, further including gating means for generating a signal in response to the dial pulse mode bistable device and the multifrequency mode bistable device both being in the second stable state to thereby designate a high-speed binary coded output pulsing mode;

and means for coupling both digit position to binary coded output pulsing equipment during said binary coded output pulsing mode.

15. In a communication switching system, the combination as claimed in claim 10, wherein the states of said dial pulse mode bistable device and multifrequency mode bistable device may be changed from one state to the other state between digits during output pulsing for a given call, to thereby change the mode of outpulsing.

16. In a communication switching system, a sender unit for generating output pulses in either a dial pulse or a multifrequency mode comprising:

a cyclic counter;

a counter control bistable device;

digit storage apparatus;

a dial pulse mode bistable device and a multifrequency mode bistable device, one or the other of the last two said bistable devices being set to a first state as required for designating that output pulses are to be produced in a corresponding mode;

means for entering digit information into the storage apparatus and simultaneously setting one of the mode designating bistable devices to its first state;

two sources of driving signals one for dial pulse mode and the other for multifrequency mode, each source alternating between a first and a second level;

a driving arrangement to set the control device to a first state and advance the counter once each time the driving signal is at the first level, and to set the control device to a second state once each time the driving signal is at the second level;

gating means which is effective in response to one of said mode designating bistable devices being set to its first state for coupling the driving signals from the corresponding source to the driving arrangement so that the counter is advanced in accordance therewith;

means for producing one output pulse at each step of the counter, the sender unit being so constructed and arranged that in dial pulse mode output pulses designating one digit are produced for each cycle of the counter, and in multifrequency mode an output pulse designating one digit is produced for each step of the counter;

a coincidence detecting arrangement effective in the dial pulse mode for comparing the step of the counter with a digit in the storage apparatus to generate a coincidence signal when they correspond, means effective in response to the coincidence signal to block production of further output pulses while the counter is advanced through other steps once for each occurrence of the first level of the driving signal, to thereby produce an interdigital interval, the coincidence detecting arrangement being inhibited when the multifrequency mode bistable device is in its first state;

the setting of the mode designating bistable devices being determined independently each time digit information is entered in said storage information during a call, so that the mode of output pulsing may be changed between digits.

17. In a communication switching system, the combination as claimed in claim 16, wherein said sender unit further includes means for generating switching digit signals in a local mode effective responsive to neither of said mode designating bistable devices being set to the first state upon the entering of digit information in said storage apparatus.

References Cited by the Examiner

UNITED STATES PATENTS

| | | | |
|---|---|---|---|
| 2,897,283 | 7/1959 | Pearce et al. | 179—18 |
| 2,948,781 | 8/1960 | Sparrendahl | 179—18 |
| 3,151,220 | 9/1964 | Arnold et al. | 179—18 X |

KATHLEEN H. CLAFFY, *Primary Examiner.*

L. A. WRIGHT, *Assistant Examiner.*